(12) United States Patent
Varghese et al.

(10) Patent No.: US 12,287,849 B1
(45) Date of Patent: Apr. 29, 2025

(54) SYSTEMS AND METHODS TO AUTOMATICALLY CLASSIFY RECORDS MANAGED BY A COLLABORATION ENVIRONMENT

(71) Applicant: Asana, Inc., San Francisco, CA (US)

(72) Inventors: Joel Prince Varghese, San Francisco, CA (US); Austin Thomas, San Francisco, CA (US); Alex Hu, New York, NY (US); Sophia Jay Dytoc Tiutan, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 57 days.

(21) Appl. No.: 18/070,243

(22) Filed: Nov. 28, 2022

(51) Int. Cl.
  *G06F 16/28* (2019.01)
  *G06F 18/231* (2023.01)

(52) U.S. Cl.
  CPC .................................. *G06F 18/231* (2023.01)

(58) Field of Classification Search
  CPC .... G06F 3/0482; G06F 16/285; G06F 16/906; G06F 16/2246; G06F 18/231
  See application file for complete search history.

(56) References Cited

U.S. PATENT DOCUMENTS

| | | | |
|---|---|---|---|
| 5,233,687 A | 8/1993 | Henderson, Jr. | |
| 5,524,077 A | 6/1996 | Faaland | |
| 5,530,861 A | 6/1996 | Diamant | |
| 5,608,898 A | 3/1997 | Turpin | |
| 5,611,076 A | 3/1997 | Durflinger | |
| 5,623,404 A | 4/1997 | Collins | |
| 5,721,770 A | 2/1998 | Kohler | |
| 5,983,277 A | 11/1999 | Heile | |
| 6,024,093 A | 2/2000 | Cron | |
| 6,256,651 B1 | 7/2001 | Tuli | |
| 6,292,830 B1 | 9/2001 | Taylor | |
| 6,332,147 B1 | 12/2001 | Moran | |

(Continued)

FOREIGN PATENT DOCUMENTS

| | | |
|---|---|---|
| CN | 101305350 A | 11/2008 |
| CN | 101563671 A | 10/2009 |

(Continued)

OTHER PUBLICATIONS

"U.S. Appl. No. 14/584,750, Examiner Interview Summary mailed Feb. 25, 2016", 3 pgs.

(Continued)

*Primary Examiner* — Etienne P Leroux
*Assistant Examiner* — Cindy Nguyen
(74) *Attorney, Agent, or Firm* — Esplin & Associates, PC

(57) ABSTRACT

Systems and methods to automatically classify records managed by a collaboration environment are described herein. Exemplary implementations may perform one or more of: obtain model training information including model training input information and training output information, the training input information including a subset of work unit information included in records, the training output information including hierarchical information and/or clustering information included in records; train a machine learning model based on the model training information to generate a trained model configured to output classifications within hierarchies and/or clusters; store the train model; and/or other operations.

20 Claims, 8 Drawing Sheets

(56) References Cited

U.S. PATENT DOCUMENTS

| | | |
|---|---|---|
| 6,385,639 B1 | 5/2002 | Togawa |
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | Jilk |
| 6,938,048 B1 | 8/2005 | Jilk |
| 7,003,668 B2 | 2/2006 | Berson |
| 7,020,697 B1 | 3/2006 | Goodman |
| 7,039,596 B1 | 5/2006 | Lu |
| 7,039,654 B1 | 5/2006 | Eder |
| 7,086,062 B1 | 8/2006 | Faour |
| 7,146,326 B1 | 12/2006 | White |
| 7,155,400 B1 | 12/2006 | Jilk |
| 7,349,920 B1 | 3/2008 | Feinberg |
| 7,401,131 B2 | 7/2008 | Robertson |
| 7,418,482 B1 | 8/2008 | Lusher |
| 7,428,723 B2 | 9/2008 | Greene |
| 7,640,511 B1 | 12/2009 | Keel |
| 7,644,145 B2 | 1/2010 | Rockwell |
| 7,676,542 B2 | 3/2010 | Moser |
| 7,702,532 B2 | 4/2010 | Vigil |
| 7,778,866 B2 | 8/2010 | Hughes |
| 7,779,039 B2 | 8/2010 | Weissman |
| RE41,737 E | 9/2010 | Leem |
| 7,792,795 B1 | 9/2010 | Swartz |
| 7,805,327 B1 | 9/2010 | Schulz |
| RE41,848 E | 10/2010 | Daniell |
| 7,831,978 B2 | 11/2010 | Schaad |
| 7,840,943 B2 | 11/2010 | Volkov |
| 7,917,855 B1 | 3/2011 | Satish |
| 7,941,453 B1 | 5/2011 | Scheevel |
| 7,945,469 B2 | 5/2011 | Cohen |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,499,300 B2 | 7/2013 | Zimberg |
| 8,522,240 B1 | 8/2013 | Merwarth |
| 8,527,287 B1 | 9/2013 | Bhatia |
| 8,554,832 B1 | 10/2013 | Moskovitz |
| 8,572,477 B1 | 10/2013 | Moskovitz |
| 8,626,547 B2 | 1/2014 | Hirano |
| 8,627,199 B1 | 1/2014 | Handley |
| 8,639,552 B1 | 1/2014 | Chen |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,600,136 B1 | 3/2017 | Yang |
| 9,674,361 B2 | 6/2017 | Ristock |
| 9,712,576 B1 | 7/2017 | Gill |
| 9,785,445 B2 | 10/2017 | Mitsui |
| 9,830,398 B2 | 11/2017 | Schneider |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,594,788 B2 | 3/2020 | Larabie-Belanger |
| 10,606,859 B2 | 3/2020 | Smith |
| 10,613,735 B1 | 4/2020 | Karpe |
| 10,616,151 B1 | 4/2020 | Cameron |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,082,281 B2 | 8/2021 | Justin |
| 11,095,468 B1 | 8/2021 | Pandey |
| 11,113,667 B1 | 9/2021 | Jiang |
| 11,138,021 B1 | 10/2021 | Rosenstein |
| 11,140,174 B2 | 10/2021 | Patel |
| 11,204,683 B1 | 12/2021 | Sabo |
| 11,212,242 B2 | 12/2021 | Cameron |
| 11,212,326 B2 | 12/2021 | Faulkner |
| 11,263,228 B2 | 3/2022 | Koch |
| 11,288,081 B2 | 3/2022 | Sabo |
| 11,290,296 B2 | 3/2022 | Raghavan |
| 11,327,645 B2 | 5/2022 | Karpe |
| 11,341,444 B2 | 5/2022 | Sabo |
| 11,341,445 B1 | 5/2022 | Cheng |
| 2002/0065798 A1 | 5/2002 | Bostleman |
| 2002/0082889 A1 | 6/2002 | Oliver |
| 2002/0120480 A1 | 8/2002 | Kroeger |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0126001 A1 | 7/2003 | Northcutt |
| 2003/0200223 A1 | 10/2003 | Hack |
| 2003/0225598 A1 | 12/2003 | Yu |
| 2003/0233265 A1 | 12/2003 | Lee |
| 2003/0233268 A1 | 12/2003 | Taqbeem |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0268451 A1 | 12/2004 | Robbin |
| 2005/0210394 A1 | 9/2005 | Crandall |
| 2005/0216111 A1 | 9/2005 | Ooshima |
| 2005/0216324 A1 | 9/2005 | Maithell |
| 2005/0222971 A1 | 10/2005 | Cary |
| 2006/0028917 A1 | 2/2006 | Wigginton |
| 2006/0041447 A1 | 2/2006 | Vucina |
| 2006/0047454 A1 | 3/2006 | Tamaki |
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen, III |
| 2006/0200264 A1 | 9/2006 | Kodama |

(56) References Cited

U.S. PATENT DOCUMENTS

| | | |
|---|---|---|
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0114809 A1 | 5/2008 | MacBeth |
| 2008/0120129 A1 | 5/2008 | Seubert |
| 2008/0126930 A1 | 5/2008 | Scott |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2009/0307349 A1 | 12/2009 | Harris |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0254299 A1 | 9/2013 | Burshtein |
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1 | 2/2014 | Taber |
| 2014/0040780 A1 | 2/2014 | Artzt |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |

(56) References Cited

U.S. PATENT DOCUMENTS

| | | |
|---|---|---|
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0006448 A1 | 1/2015 | Gupta |
| 2015/0007058 A1 | 1/2015 | Wooten |
| 2015/0012330 A1 | 1/2015 | Sugiura |
| 2015/0052437 A1 | 2/2015 | Crawford |
| 2015/0058053 A1 | 2/2015 | De |
| 2015/0113540 A1 | 4/2015 | Rabinovici |
| 2015/0134393 A1 | 5/2015 | De |
| 2015/0153906 A1 | 6/2015 | Liao |
| 2015/0213411 A1 | 7/2015 | Swanson |
| 2015/0215256 A1 | 7/2015 | Ghafourifar |
| 2015/0262111 A1 | 9/2015 | Yu |
| 2015/0294245 A1 | 10/2015 | Nagar |
| 2015/0312375 A1 | 10/2015 | Valey |
| 2015/0317595 A1 | 11/2015 | De |
| 2015/0339006 A1 | 11/2015 | Chaland |
| 2015/0358468 A1 | 12/2015 | Erhart |
| 2015/0363092 A1 | 12/2015 | Morton |
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0162819 A1* | 6/2016 | Hakman ............ G06Q 10/0633 705/7.27 |
| 2016/0180277 A1 | 6/2016 | Skiba |
| 2016/0180298 A1 | 6/2016 | Mcclement |
| 2016/0182311 A1 | 6/2016 | Borna |
| 2016/0188145 A1 | 6/2016 | Gabor |
| 2016/0216854 A1 | 7/2016 | Mcclellan |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0292620 A1 | 10/2016 | De |
| 2016/0300024 A1 | 10/2016 | Janssen |
| 2016/0313934 A1 | 10/2016 | Isherwood |
| 2016/0328217 A1 | 11/2016 | Hagerty |
| 2016/0342927 A1 | 11/2016 | Reznik |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0052656 A1 | 2/2017 | Ohsumi |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0147960 A1 | 5/2017 | Jahagirdar |
| 2017/0153799 A1 | 6/2017 | Hoyer |
| 2017/0154024 A1 | 6/2017 | Subramanya |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0249577 A1 | 8/2017 | Nishikawa |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0344754 A1 | 11/2017 | Kumar |
| 2017/0346861 A1 | 11/2017 | Pearl |
| 2017/0351385 A1 | 12/2017 | Ertmann |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0088754 A1 | 3/2018 | Psenka |
| 2018/0089625 A1 | 3/2018 | Rosati |
| 2018/0095938 A1 | 4/2018 | Monte |
| 2018/0102989 A1 | 4/2018 | Borsutsky |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189736 A1 | 7/2018 | Guo |
| 2018/0225795 A1 | 8/2018 | Napoli |
| 2018/0247352 A1 | 8/2018 | Rogers |
| 2018/0260081 A1 | 9/2018 | Beaudoin |
| 2018/0262620 A1 | 9/2018 | Wolthuis |
| 2018/0285149 A1 | 10/2018 | Bhandari |
| 2018/0285471 A1 | 10/2018 | Hao |
| 2018/0315491 A1 | 11/2018 | Filipovich |
| 2018/0316636 A1 | 11/2018 | Kamat |
| 2018/0331842 A1 | 11/2018 | Faulkner |
| 2018/0357049 A1 | 12/2018 | Epstein |
| 2018/0365626 A1 | 12/2018 | Mansour |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0197487 A1 | 6/2019 | Jersin |
| 2019/0213509 A1 | 7/2019 | Burleson |
| 2019/0265821 A1 | 8/2019 | Pearl |
| 2019/0286462 A1 | 9/2019 | Bodnick |
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0019907 A1 | 1/2020 | Notani |
| 2020/0059539 A1 | 2/2020 | Wang |
| 2020/0063333 A1* | 2/2020 | Mahanty ............ B23K 26/352 |
| 2020/0065736 A1 | 2/2020 | Relangi |
| 2020/0159507 A1 | 5/2020 | Bodin |

(56) References Cited

U.S. PATENT DOCUMENTS

| | | |
|---|---|---|
| 2020/0160270 A1 | 5/2020 | Bodin |
| 2020/0160377 A1 | 5/2020 | Bodin |
| 2020/0160458 A1 | 5/2020 | Bodin |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0219061 A1 | 7/2020 | Guo |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0097466 A1 | 4/2021 | Sabo |
| 2021/0103451 A1 | 4/2021 | Sabo |
| 2021/0110347 A1 | 4/2021 | Khalil |
| 2021/0136012 A1 | 5/2021 | Barbitta |
| 2021/0150135 A1 | 5/2021 | Lereya |
| 2021/0150489 A1 | 5/2021 | Haramati |
| 2021/0157978 A1 | 5/2021 | Haramati |
| 2021/0166339 A1 | 6/2021 | Mann |
| 2021/0182475 A1 | 6/2021 | Pelz |
| 2021/0216562 A1 | 7/2021 | Smith |
| 2021/0232282 A1 | 7/2021 | Karpe |
| 2021/0319389 A1 | 10/2021 | Jafari |
| 2021/0320891 A1 | 10/2021 | Rosenstein |
| 2021/0342785 A1 | 11/2021 | Mann |
| 2021/0342786 A1 | 11/2021 | Jiang |
| 2021/0350303 A1 | 11/2021 | Omar |
| 2021/0357380 A1 | 11/2021 | Morad |
| 2021/0357423 A1 | 11/2021 | Haramati |
| 2021/0357862 A1 | 11/2021 | Lereya |
| 2021/0357863 A1 | 11/2021 | Cohen |
| 2021/0382734 A1 | 12/2021 | Rosenstein |
| 2021/0383261 A1* | 12/2021 | Hanna ............. G06Q 10/105 |
| 2021/0390486 A1 | 12/2021 | Chu |
| 2022/0019320 A1 | 1/2022 | Sabo |
| 2022/0058548 A1 | 2/2022 | Garg |
| 2022/0075792 A1 | 3/2022 | Koch |
| 2022/0078142 A1 | 3/2022 | Cameron |
| 2022/0158859 A1 | 5/2022 | Raghavan |
| 2022/0171637 A1 | 6/2022 | Sabo |
| 2022/0188715 A1 | 6/2022 | Cheng |
| 2022/0214787 A1 | 7/2022 | Karpe |
| 2022/0215315 A1 | 7/2022 | Sabo |
| 2022/0284340 A1* | 9/2022 | Choudhary ............ G06N 20/10 |
| 2022/0343282 A1 | 10/2022 | Hood |
| 2022/0414323 A1 | 12/2022 | Sreenivasan |
| 2023/0118369 A1 | 4/2023 | Sabo |
| 2023/0153732 A1 | 5/2023 | Akers |
| 2023/0325747 A1 | 10/2023 | Sabo |
| 2024/0323106 A1 | 9/2024 | Mann |
| 2024/0346407 A1 | 10/2024 | Matson |

FOREIGN PATENT DOCUMENTS

| | | |
|---|---|---|
| CN | 102378975 B | 5/2015 |
| WO | 2015036817 A1 | 3/2015 |
| WO | 2015123751 A1 | 8/2015 |
| WO | 2020006634 A1 | 1/2020 |

OTHER PUBLICATIONS

"U.S. Appl. No. 14/584,750, Non Final Office Action mailed Aug. 28, 2015", 21 pgs.
"U.S. Appl. No. 14/584,750, Notice of Allowance mailed Mar. 28, 2016", 8 pgs.
"U.S. Appl. No. 14/584,750, Response filed Feb. 29, 2015 to Non Final Office Action mailed Aug. 28, 2015", 16 pgs.
"U.S. Appl. No. 14/584,850, Final Office Action mailed Sep. 1, 2017", 31 pgs.
"U.S. Appl. No. 14/584,850, Non Final Office Action mailed Jan. 10, 2017", 9 pgs.
"U.S. Appl. No. 14/584,850, Response filed Apr. 10, 2017 to Non Final Office Action mailed Jan. 10, 2017", 13 pgs.
"How to Asana: Inviting teammates to Asana." YouTube, Asana, Mar. 21, 2017, https://www.youtube.com/watch?v=TLOruY1KyxU ( Year: 2017), 13 pages.
"Rules of Data Conversion from Document to Relational Databases", published: 2014, publisher: Future-processing, pp. 1-8 (Year: 2014).
(Tiburca, Andrew) Best Team Calendar Applications for 2018—Toggl https://toggl.com/blog/best-team-calendar-applications-for-2018 (Year: 2017) 3 pages.
Asana Demo and Product Tour, you tube excerpt, Dec. 7, 2017 https://www.youtube.com/watch?v=IMAFWVLGFyw (Year: 2017) (16 pages).
Asana integrations, Asana tutorial, youtube, excerpt, Nov. 16, 2016 https://www.youtube.com/watch?v=hBiQ7DJNinE (Year: 2016) (21 pages).
Asana Workload and Portfolios, youtube, excerpt, Aug. 1, 2019 https://www.youtube.com/watch?v=7XkNcfFDG6M (Year: 2019) (20 pages).
Asana YouTube channel, list of all product videos, Nov. 19, 2014-Aug. 19, 2019 https://www.youtube.com/user/AsanaTeam/videos?disable_polymer=1 (Year: 2019) (5 pages).
Asana, Task dependencies, archives org, Aug. 25, 2017 https://web.archive.org/web/20170825002141/https://asana.com/guide/help/tasks/dependencies (Year: 2017) (5 pages).
Asana,Manage your team capacity with Workload, youtube, excerpt, Aug. 1, 2019 https://www.youtube.com/watch?v=2ufXyZDzZnA &list=PLJFG93oi0wJAi UwyOhIGWHdtJzJrzyIBv (Year: 2019) (1 page).
Assef, F., Cassius, T. S., & Maria, T. S. (2018). Confrontation between techniques of time measurement. Journal of Manufacturing Technology Management, 29(5), 789-810. (Year: 2018).
Biggs, "GateGuru Relaunches With New Ways to Streamline Your Travel Experience", Techcrunch, (Apr. 26, 2013), 3 pgs.
Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).
Command and control, wikipedia, archives org, Mar. 16, 2018 https://web.archive.org/web/20180316193655/https://en.wikipedia.org/wiki/Command_and_control (Year: 2018), 6 pages.
Creating Tables with Fields from 2 Different Tables, published: 2009, publisher: StackOverflow, pp. 1-2. (Year: 2009).
Critical chain project management, Wikipedia, archives org, Dec. 17, 2016 https://web.archive.Org/web/20161217090326/https://en.wikipedia.org/wiki/Critical_chain_project_management (Year: 2016) 5 pages.
Critical Path Method, Wikipedia, archives org, Sep. 19, 2017 https://web.archive.Org/web/20170919223814/https://en.wikipedia.org/wiki/Critical_path_method (Year: 2017) 6 pages.
Dawei Li, "Deepcham: Collaborative Edge-Mediated Adaptive Deep Learning for Mobile Object Recognition", 2016, IEEE/ACM, pp. 64-76. (Year: 2016).
Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.
Hartmann, "TimeProjectscheduling with resource capacities and requests varying with time: a case study," 2013, Flexible services and manufacturing journal, vol. 25, No. 1, pp. 74-93 (Year: 2013).
Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).
How to Asana Asana time tracking, youtube, excerpt, May 24, 2017 https://www.youtube.com/watch?v=z91qlex-TLc (Year: 2017) (1 page).

(56) References Cited

OTHER PUBLICATIONS

How to Asana, Asana project management, youtube, excerpt, Mar. 7, 2017 https://www.youtube.com/watch?v=qqANMTvVpE (Year: 2017) (28 pages).

How to Asana, Creating your first Asana project, youtube, excerpt, Jan. 31, 2017 https://www.youtube.com/watch?v=L04WmcUdsLo (Year: 2017) (1 page).

How to Asana, Getting Asana into your workflow, youtube, excerpt, Jul. 17, 2017 https://www.youtube.com/watch?v=7YLrNMdv3o (Year: 2017) (24 pages).

How to Asana, Planning with Asana calendar, youtube excerpt, Feb. 14, 2017 https://www.youtube.com/watch?v=w8t6KYiVPyc (Year: 2017) (19 pages).

How to Asana, Using Asana for task management, youtube, excerpt, Feb. 7, 2017 https://www.youtube.com/watch?v=vwvbgiejhQ (Year: 2017) (8 pages).

How to Asana, Visualizing work with Asana kanban boards, youtube, excerpt, Feb. 21, 2017 https://www.youtube.com/watch?v=jmZaZGydfPY (Year: 2017) (41 pages).

How to Asana, Workflow management, youtube, excerpt, May 30, 2017 https://www.youtube.com/watch?v=rk8nPWmXsRo (Year: 2017) (9 pages).

How to use Advanced Search in Asana, Asana tutorial, May 25, 2016 https://www.youtube.com/watch?v=5VyJ3toPfQM (Year: 2016) (28 pages).

Justin Rosenstein, Unveiling the Future of Asana, Mar. 28, 2018 https://www.youtube.com/watch?v=nRI?d_WM4Bc (Year: 2018) (2 pages).

Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).

Macro, computer science, wikipedia, archives org, 6 pages, Feb. 11, 2020 http://web.archive.org/web/20200211082902/https://en.wikipedia.org/wiki/Macro_(computer_science) (Year: 2020) 6 pages.

Mauricio Aizawa, Zapier, How to Automate Asana Tasks creation using Evernote, youtube excerpts, Mar. 16, 2018 https://www.youtube.com/watch?v=BjDQ4Gny4WI (Year: 2018) (8 pages).

Paul Minors, How to automate your tasks, youtube excerpts, Oct. 18, 2019 https://www.youtube.com/watch?v=IwF9XyUQrzw (Year: 2019).

Prioritize My Tasks in Asana, Asana tutorial, youtube, excerpt, May 25, 2016 https://www.youtube.com/watch?v=UbCnMvw01nl (Year: 2016) (3 pages).

Project views, Asana tutorial, youtube, excerpt May 25, 2016 https://www.youtube.com/watch?v=FYjA8ZH3ceQ (Year: 2016) (5 pages).

Using Asana Premium, Asana tutorial, youtube, excerpt, Sep. 10, 2016 https://www.youtube.com/watch?v=vMgLtDDmyeo (Year: 2016) (4 pages).

Where does Asana fit in, archives org, Jul. 8, 2017 https://web.archive.org/web/20170708150928/https://asana.com/guide/resources/infosheets/where-does-asana-fit (Year: 2017) (5 pages).

Wix.com, How to Use Wix Code with Marketing Tools to Create Custom Events, Oct. 18, 2018, YouTube, https://www.youtube.com/watch?v=MTBVykOYGvO&feature=emb_title, 2 pages.

www.asana.com (as retrieved from https://web.archive.Org/web/20160101054536/https://asana.com/press and https://web.archive.org/web/20160101054527/https://asana.com/product) (Year: 2016) 15 pages.

www.cogmotive.com/blog/author/alan Alan Byrne: "Creating a company Shared Calendar in Office 365"; pp. 1-17; Sep. 10, 2013 (16 pages).

D. Surian, N. Liu, D. Lo, H. Tong, E.-P. Lim and C. Faloutsos, "Recommending People in Developers' Collaboration Network," 2011 18th Working Conference on Reverse Engineering, Limerick, Ireland, 2011, pp. 379-388, doi: 10.1109/WCRE.2011.53 (Year: 2011).

* cited by examiner

700

702 Due This Week

704 Advertisements

706 Recently Assigned

708
Prepare first draft of ad for the ABC Co.

Due Date: Tomorrow

710
Send ad to the ABC Co.

Due Date: 10/01

712
Schedule meeting with Isaac

Due Date: 08/27

714
Review plans for New, Inc.

Due Date: Thursday

716
Discuss advertising plans for 128 Co.

Due Date: 09/30

SYSTEMS AND METHODS TO AUTOMATICALLY CLASSIFY RECORDS MANAGED BY A COLLABORATION ENVIRONMENT

FIELD OF THE DISCLOSURE

The present disclosure relates to systems and methods to automatically classify records managed by a collaboration environment.

BACKGROUND

Web-based collaboration environments, sometimes referred to as work management platforms, may enable users to assign projects, tasks, or other assignments to assignees (e.g., other users) to complete. A collaboration environment may comprise an environment in which individual users and/or a virtual team of users does its work and enables the users to work in a more organized and efficient manner when remotely located from each other.

SUMMARY

Hosting a web-based collaboration environment poses many challenges. For example, operating the collaboration environment may require precise ways of creation, storage, management, and/or provision of information that makes up the collaboration environment. One way that operators look to improve the operation of the collaboration environment is to improve parts of the collaboration environment involving substantial human-machine interaction. For example, the operation of the collaboration environment may be improved by enabling automatic classification of records. In some implementations, records may be classified into one or more clusters for organizational purposes. In some implementations, records may be classified within individual hierarchies of work unit records managed by the collaboration environment. The collaboration environment may specify a multi-tiered, hierarchical arrangement, with respect to one or more records for units of work (e.g., portfolios, projects, tasks, and/or other units of work). Individual hierarchies of work unit records may provide users of the collaboration environment with an organizational structure by classifying individual records under and/or with one or more other records.

In some implementations, a cluster may refer to a set of work unit records having a common organizational designation. In some implementations, an organizational designation may convey a common purpose or goal of a unit of work. The common purpose or goal of the unit of work may include achieving a common desired result based on completion of the units of work in a cluster. The desired result may comprise an outcome that occurs directly or indirectly as a result of completing the units of work. A cluster of records may or may not also be classified within a common hierarchy. In some implementations, an organizational designation may be user-specified and/or automatically derived from one or more techniques presented herein. Individual records managed by the collaboration environment may include clustering information describing individual clusters of work unit records.

The inventors of the present disclosure have identified that users often manually classify records into hierarchies and/or clusters. For example, a user may manually specify a classification of a task under a project or cluster, because completion of the task may be necessary for completion of the project, and/or because the task may be organized under that cluster with other tasks serving a common purpose.

To address these and/or other problems, one or more implementations presented herein propose a technique to automatically classify records managed by a collaboration environment. One or more implementations may propose a machine learning model specifically trained to classify records within individual hierarchies and/or clusters. The model may be trained based on existing information from records that were previously manually classified by one or more users. The model may be trained using a corpus of text and/or other information from existing records. Training input data may include a subset of information from the records (e.g., title, description, assignee, assignor, team, etc.), and the training output data may include the individual clusters and/or hierarchies in which they are already classified under. Natural language processing may be applied to the input data to extract semantic meaning. Meaning may also be extracted from other information, such as presence or absence of attachments, the content of the attachments, the extent of user comments, and/or other information. In some implementations, the inventors of the present disclosure have determined that performing the classification based on semantic meaning of the title of records (and/or other text-based information) may improve the classification of records using machine learning, while requiring relatively limited input. This may be because users often put a lot of thought into how to title their records for work, which the model can leverage.

These along with other features and/or functionality presented herein, may be recognized by persons of ordinary skill in the art as providing improvements upon the operation of a collaboration environment including, among others, increased efficiency and accuracy in the creation and management of the information making up records of the collaboration environment.

One or more implementations of a system to automatically classify records within a hierarchy and/or cluster of work unit records managed by the collaboration environment may include one or more hardware processors configured by machine-readable instructions and/or other components. Executing the machine-readable instructions may cause the one or more hardware processors to facilitate automatically classifying records managed by a collaboration environment. The machine-readable instructions may include one or more computer program components. The one or more computer program components may include one or more of an environment state component, a user interface component, a training component, a classification prediction component, an organization component, and/or other components.

The environment state component may be configured to manage environment state information maintaining a collaboration environment. The collaboration environment may be configured to facilitate interaction by users with the collaboration environment. The environment state information may include one or more records. The one or more records may include user records, work unit records, and/or other records. The work unit records may include work unit information and/or other information. The work unit information may characterize units of work created, managed, and/or assigned to within the collaboration environment to the users who are expected to accomplish one or more actions to complete the units of work. The work unit information may comprise values of work unit parameters characterizing the units of work.

In some implementations, collections of the work unit records may be organized into individual hierarchies of the work unit records. An individual hierarchy may convey hierarchical organization among the work unit records in an individual collection of the work unit record. In some implementations, individual hierarchies of the work unit records may be defined by hierarchical information included in the work unit records.

In some implementations, collections of the work unit records may further organized into individual clusters of the work unit records. An individual cluster may convey a common organizational designation among the work unit records in an individual collection of the work unit records classified within the individual cluster. The organizational designation may include a stated purpose or goal of the work unit records classified within the individual cluster. The individual clusters of the work unit records may be defined by clustering information included in the work unit records The training component may be configured to obtain model training information. The model training information may include one or more of training input information, training output information, and/or other information. The training input information may include values of a subset of the work unit information included in one or more work unit records. The model training output information may include the hierarchical information and/or the clustering information included in the work unit records.

The training component may be configured to train a model using the model training information to generate a trained model. The trained model may be configured to receive input of the subset of the work unit information included in other ones of the work unit records. The trained model may be configured to output predictions of classifications of the other ones of the work unit records in individual hierarchies and/or individual clusters. The classifications of the other ones of the work unit records may generate hierarchical information and/or clustering information for the other ones of the work unit records. The training component may be configured to store the trained model in non-transitory electronic storage.

The classification prediction component may be configured to obtain an identification of a collection of work unit records for which classification into a hierarchy and/or cluster may desired. The classification component may be configured to provide a subset of work unit information included in the collection as input for the trained model. The trained model may be configured to output classifications of the work unit records in the collection within one or more hierarchies and/or one or more clusters.

The organization component may be configured to obtain the output from the trained model. The organization component may be configured to generate, from the output, hierarchical information and/or clustering information for the work unit records in the collection.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
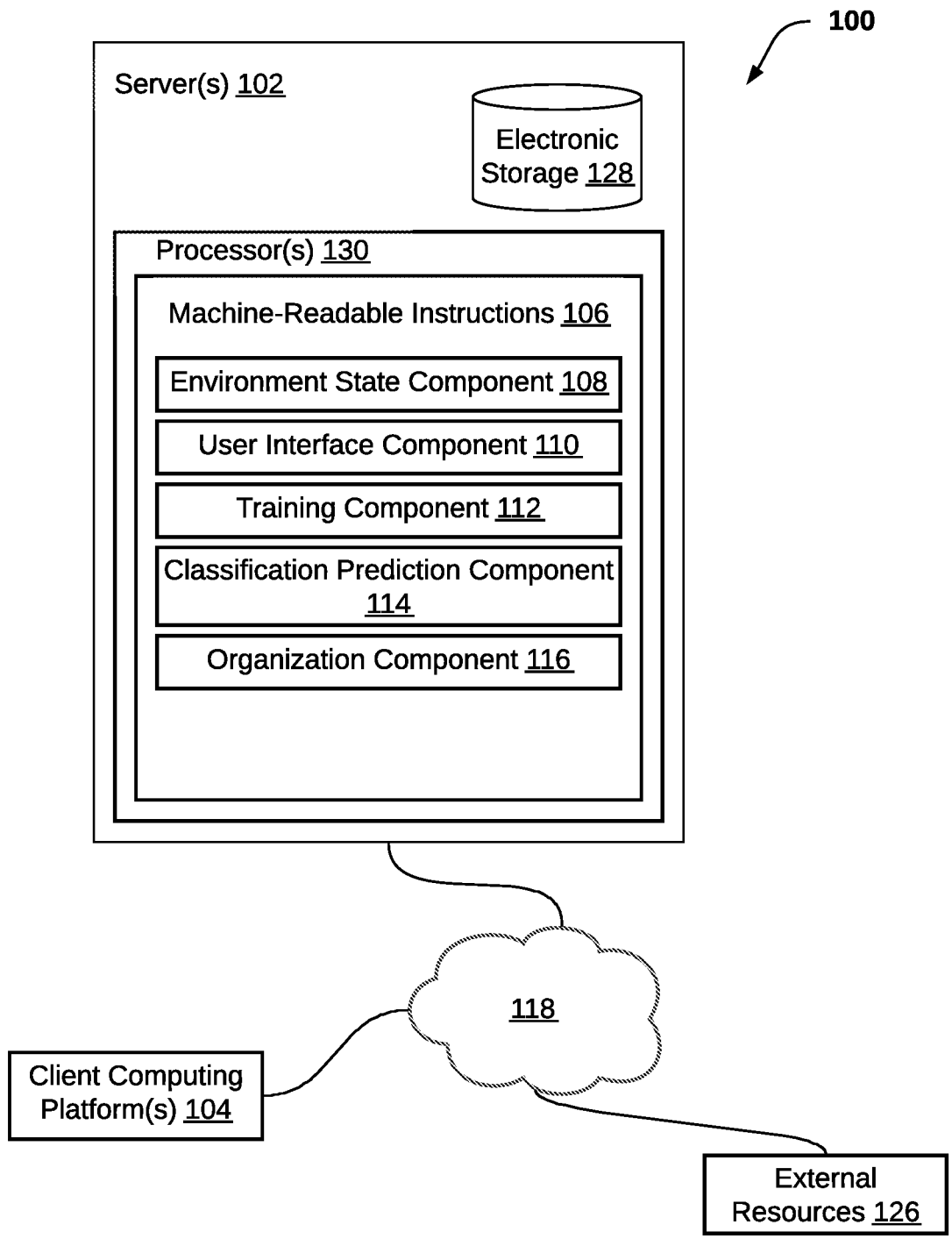
FIG. 1 illustrates a system configured to automatically classify records managed by a collaboration environment, in accordance with one or more implementations.

FIG. 1 illustrates a system 100 configured to automatically classify records managed by a collaboration environment. In some implementations, records may be classified into one or more clusters and/or one or more hierarchies. The system 100 may to improve the operation of the collaboration environment by implementing a machine-learning model trained in a way that leverages existing information within the collaboration environment. For example, users may manually classify records within individual hierarchies and/or individual clusters. After creating a record within the collaboration environment, a user may define the record as subordinate to another record within an individual hierarchy. After creating a record within the collaboration environment, a user may define the record as within the same cluster as another work unit record (e.g., classifying a record for a new task under a section describing another task). Manually classifying records within an individual hierarchy and/or an individual cluster of work unit records may be time consuming, may decrease workflow efficiency, may result in classifications that are counterproductive (e.g., confusing, contradictory, inaccurate, and/or counterproductive in other ways) due to user error, and/or may suffer from other drawbacks. However, users often put a lot of thought into how they name and/or describe their records for work, which the model can leverage to achieve an improved automated manner of classifying records into clusters and/or hierarchies.

In some implementations, system 100 may include one or more of one or more servers 102, one or more client computing platforms 104, external resource(s) 126, and/or other components. Server(s) 102 may be configured to communicate with one or more client computing platforms 104, one or more external resources 126, and/or other entities of system 100 according to a client/server architecture and/or other architectures. Client computing platform(s) 104 may be configured to communicate with other client computing platforms via server(s) 102 and/or according to a peer-to-peer architecture and/or other architectures. Users may access system 100 and/or instances of the collaboration environment via client computing platform(s) 104. Server(s) 102 may be remote from client computing platform(s) 104. Client computing platform(s) 104 may be remote from each other.

Server(s) 102 may include one or more of non-transitory electronic storage 128, one or more processors 130 configured by machine-readable instructions 106, and/or other components. The non-transitory electronic storage 128 may store one or more records, model training information, a trained machine learning model, and/or other information. Machine-readable instructions 106 may include one or more instruction components. The instruction components may include computer program components. Executing the machine-readable instructions 106 may cause server(s) 102 to facilitate classification of records managed by the collaboration environment. The computer program components may include one or more of an environment state component 108, a user interface component 110, a training component 112, a classification prediction component 114, an organization component 116, and/or other components.

Environment state component 108 may be configured to manage environment state information and/or other information used in maintaining a collaboration environment. The collaboration environment may be configured to facilitate interaction by users with the collaboration environment. The environment state information may include one or more records. The one or more records may include one or more of user records, work unit records, and/or other records. The user records may include user information describing the users of the collaboration environment. The work unit records may include work unit information describing units of work assigned to, created by, and/or managed by the users within the collaboration environment.

The user information in the user records may include values of user parameters and/or other information. The values of the user parameters may be organized in the user records corresponding to users interacting with and/or viewing the collaboration environment. The values of the user parameters may include information describing and/or identifying the users, their actions within the collaboration environment, their settings, metadata associated with the users, work they are members of and/or collaborate on, and/or other user information. Individual ones of the users may be associated with individual ones of the user records. A user record may define values of the user parameters associated with a given user.

The values of the user parameters may, by way of non-limiting example, specify one or more of: a user name, a group, a user account, user role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), work inclusion information (e.g., identification of work unit records they are members of and/or collaborate on), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (units of work assigned to the user, assigned to other users by the user, completed by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, schedule information, and/or other information.

Schedule information for the individual users may include one or more calendar entries associated with the individual users. The individual calendar entries may be associated with individual start dates and individual end dates. In some implementations, schedule information may be stored locally within electronic storage 128 by virtue of features and/or functionality provided within a collaboration environment. By way of non-limiting illustration, a collaboration environment may have features and/or functionality of a calendar application configured to facilitate calendaring entries into a schedule. It is noted that schedule information may be determined through features and/or functionality provided by one or more external resources 126. By way of non-limiting illustration, external resources may include a calendar application which may be external to a collaboration environment. The collaboration environment may have permissions to access the external calendar application to determine and/or obtain schedule information.

Work inclusion information may include identification(s) of work unit records that individual users are members of, and/or collaborate with one or more other users on.

Collaboration between users may include performing shared and/or cooperative actions within the collaboration environment to complete one or more of the units of work. The shared and/or cooperative actions may include one or more of communication actions, work completion actions, and/or other actions. One or more implementations of the present disclosure may be configured to leverage the fact that users may be interacting with the collaboration environment and/or each other in synchronous and/or asynchronous ways using remotely located client computing platforms. For example, a user may log into the collaboration environment and perform one or more actions and then sign out. The user may log in at a later date and notice that the collaboration environment has changed due to changes that were made by one or more other users while they were signed out. Accordingly, collaboration between users may have been occurring without any direct knowledge of other user's actions within the collaboration environment. At least some of the collaboration between users may be non-intuitive and/or not immediately knowable. Instead, one or more implementations described herein may take advantage of the existence of the work unit records that are stored and maintained by server(s) 102 which store and track user actions. From these records, collaboration may then be derived and/or determined in ways that would otherwise not be possible by the users individually and/or together.

Communication actions may include communicating within and/or outside the collaboration environment about a unit of work in an effort to advance progress toward completion of the unit of work and/or other units of work associated with the unit of work. Communicating within the collaboration environment may include one or more of adding comments to a comment thread, messaging via chat interfaces of the collaboration environment, adding comments as metadata to digital content items that are associated with a unit of work, "@" mentioning one or more users, and/or other actions. Communicating outside the collaboration environment may include one or more of communication through e-mail, generating calendar items that relate to completion of a unit of work, conducting meetings (in person and/or virtual), messaging via chat interfaces that are external to the collaboration environment, and/or other actions.

Work completion actions may include actions performed within the collaboration environment that are related to advancing progress of one or more work unit records for one or more units of work. The actions may include one or more of creating work unit records, assigning work unit records, marking units of work as complete, adding due dates to units of work, and/or other actions.

The "members" of the work unit records may include specifically-named users within the work unit records. Specifically naming users may be accomplished by linking user records for those users to the work unit records. Linking the user records to the work unit records may comprise including a referential notation of the user records in the work unit records. Linking the user records to the work unit records may comprise including copies or instances of the user records in the work unit records. In some implementations, users having a particular status with respect to a work unit record may be considered members. By way of non-limiting illustration, users who are designated to perform one or more actions to facilitate completion of the units of work (e.g., assignees, assignors, creators, managers, collaborators, and/or other users) may be considered members. In some implementations, "member" status may be a status that is separate and distinct from users who are activity performing one or more actions to facilitate completion of the units of work. In some implementations, "member" may refer to users who view, access, monitor, and/or otherwise engage with units of work in ways that may not directly facilitate completion of the units of work.

The work unit information in the work unit records may include values of one or more work unit parameters and/or other information. The values of the work unit parameters may be organized in work unit records corresponding to units of work managed, created, and/or assigned within the collaboration environment. A given unit of work may have one or more assignees, owners, and/or collaborators working on the given work unit. Units of work may include one or more of tasks, projects, objectives, and/or other units of work.

Work unit records may be created by a given user for the given user and/or created by the given user and assigned to one or more other users. Work unit records may be created by a given user for the given user and/or created by the given user and managed by one or more other users. Tasks may include to-do items and/or action items one or more users should accomplish and/or plan on accomplishing in order to complete a task. Individual units of work may include and/or may be associated with one or more digital content items. An individual unit of work may include an individual digital content item by virtue of the individual digital content item (and/or a copy or instance thereof) being attached and/or appended thereto. A digital content item may include one or more of an image, a video, an audio file, a PDF, a word document, and/or other digital content items.

In some implementations, work unit records created by, assigned to, and/or completed by the users may refer generally to a linking of the work unit records with the individual users in the collaboration environment. A work unit record may be linked with a user in a manner that defines one or more relationships between the user and the work unit record. Such a relationship may connote and/or be a result of an action (past, present, and/or future) of the user with respect to the unit of work and/or work unit record. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, being assigned a role at the unit of work level, and/or other actions.

Individual work unit records may include hierarchical information defining individual hierarchies managed by the collaboration environment. The hierarchical information of a work unit record may include one or more of information identifying one or more other work unit records associated with the work unit record in one or more individual hierarchies, a specification of the position of the work unit record in an individual hierarchy, restrictions and/or other relationships placed on the work unit record by virtue of its position, and/or other information.

Individual work unit records may include clustering information defining individual clusters managed by the collaboration environment. The clustering information of a work unit record may include one or more of information identifying one or more other work unit records associated with the work unit record in one or more individual clusters, and/or other information.

In some implementations, values of work unit parameters may specify one or more of a unit of work title, a unit of work description, user role information, one or more unit of work dates (e.g., a start date, a due date or end date, a completion date, and/or dates), project inclusion (e.g., identification of projects supported by the individual units of work), objective inclusion (e.g., identification of objectives supported by the individual units of work), cluster inclusion (e.g., identifying an organizational designation of the work unit record), one or more members associated with a unit of work (e.g., an owner, one or more collaborators, collaborator access information, and/or other unit of work collaborators and/or collaborator information), completion state, one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, state of a workspace for a given unit of work (e.g., application state parameters, application status, application interactions, user information, and/or other parameters related to the state of the workspace for a unit of work), one or more performance/productivity metrics for a given unit of work, hierarchical information, clustering information, dependency information, association information, one or more custom fields (e.g., priority, cost, stage, and/or other custom fields), and/or other information.

In some implementations, work unit parameters may include one or more of a work assignment parameter, a work completion parameter, a work management parameter, a work creation parameter, a dependency parameter, a grouping parameter, a cluster parameter, a title parameter, a description parameter, and/or other parameters. The values of the work assignment parameter may describe assignees of individual units of work. The values of the work management parameter may describe users who manage individual units of work and/or the extent in which they manage. The values of the work creation parameter may describe creation characteristics of individual units of work. The creation characteristics may include who created the work unit record, when it was created, and/or other information.

In some implementations, values of a dependency parameter may describe whether a given unit of work is dependent on one or more other units of work. A unit of work being dependent on an other unit of work may mean the unit of work may not be completed, started, assigned, and/or have other interactions performed in relation to the unit of work before some action is performed on the other unit of work. By way of non-limiting illustration, a unit of work may not be started until another unit of work is completed, meaning the unit of work may be dependent on the other unit of work. In some implementations, values of the dependency parameter may go hand in hand with the hierarchical information. By way of non-limiting illustration, a unit of work that is subordinate within an individual hierarchy to an other unit of work may be dependent on the other unit of work, or vice versa.

The values of the work assignment parameter describing assignment of users to units of work may be determined based on one or more interactions by one or more users with a collaboration environment. In some implementations, one or more users may create and/or assign one or more units of work to themselves and/or one or more other users. In some implementations, a user may be assigned a unit of work and the user may effectuate a reassignment of the unit of work from the user or one or more other users.

In some implementations, values of the work completion parameter may indicate that a completion status of a unit of work has changed from "incomplete" to "marked complete" and/or "complete." In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date). In some implementations, a completion status may include one or more of "rejected," "revisions required," "incomplete," and/or other statuses. By way of non-limiting illustration, for units of work that require one user to review work by another user, additional user interface elements may be presented where users can set the status as one or more of "marked complete," "incomplete," "rejected," "revisions required," and/or other statuses. In some implementations, a status of rejected for a unit of work may be associated with the passing of an end date associated with the unit of work without the work having been marked complete manually. In some implementations, a status of rejected for a unit of work may be associated with a user specifying the unit of work as rejected. In some implementations, a status of revisions required for a unit of work may be associated with a user specifying that the work being reviewed requires changes, but is otherwise approved. In some implementations, a status of revisions required may present the reviewing user with options to specify what revisions are required. In some implementations, a status of revisions required may cause a follow up unit of work to be generated which is assigned back to the assignor of the original work.

In some implementations, values of a grouping parameter may describe whether a given unit of work supports (e.g., is included in) a project and/or objective. The values may specify one or more of a name/title of another work unit record (e.g., project, objective), a name/username of an owner of another work unit record, and/or other information.

In some implementations, values of a cluster parameter may include clustering information and/or other information. Clustering information may describe an organizational designation of a work unit record. The values may describe an organizational designation by describing a purpose or goal of a unit of work. The purpose or goal of the unit of work may define a desired result of completion of the units of work characterized by the work unit records in the cluster. By way of non-limiting example, after creating a work unit record within the collaboration environment, a user may define the work unit record as part of an individual cluster. Defining an individual work unit record as part of an individual cluster may result in the individual work unit record being referenced by the individual cluster. Work unit records referenced by a given cluster may share a goal of completion. The values of the cluster parameter may specify one or more of a description of the organizational designation (e.g., a name/title of a cluster), a name/title of other work unit records in the cluster, and/or other information.

In some implementations, cluster-based organization may provide users with a way to organize units of work based on relation to other units of work. By way of non-limiting example, a user may identify a task as part of a cluster including another task. Organization of units of work provided by individual clusters may increase understandability of work structure and increase efficiency. Organization of the work by clusters may enable the collaboration environment to provide insights and notifications regarding related units of work, further increasing understandability and efficiency.

Figure 7:
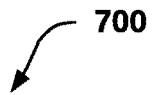
FIG. 7 illustrates a user interface, in accordance with one or more implementations.

By way of non-limiting illustration, FIG. 7 illustrates a user interface 700 of a collaboration environment, in accordance with one or more implementations. The user interface 700 may represent clusters 702, 704, and 706 of work unit records. The user interface 700 may include user interface elements 708, 710, 712, 714, and 716 representing work unit records classified within respective clusters (illustrated by columnar arrangement). By way of non-limiting illustration, interface elements 708 and 714 may represent work unit records that are part of cluster 702. For illustrative purposes, cluster 702 may define an organizational designation of work that is "due this week." Accordingly, the work unit records represented by user interface elements 708 and 714 may be part of cluster 702 by virtue of the work unit records including due dates within a current week.

User interface elements 710 and 716 may represent work unit records that are part of cluster 704. For illustrative purposes, cluster 704 may define an organizational designation of "advertisement" work. Accordingly, the work unit records represented by user interface elements 708 and 714 may be part of cluster 704 by virtue of the work unit records characterizing units of work having a purpose or goal of fulfilling advertisement work.

User interface element 712 may represent a work unit record that is part of cluster 706. For illustrative purposes, cluster 706 may define an organizational designation of work that was "recently assigned." Accordingly, the work unit record represented by user interface element 712 may be part of cluster 706 by virtue of the work unit record being recently assigned to a user of the collaboration environment.

Returning to FIG. 1, in some implementations, the values of a title parameter may include the name or title of a given work unit record. A name or title of a given work unit record may identify or describe a unit of work characterized by the given work unit record. In some cases, a user of the collaboration environment may define the name or title of a given work unit record. The user may define the name or tile such that the name or title denotes what must be done to complete the unit of work and/or who may benefit. By way of non-limiting illustration, a user may designate the name of an individual work unit record to be "Prepare first draft of ad for the ABC Co." The user may have chosen the name of the individual work unit record to describe that a draft of an advertisement must be prepared and the ABC Co. will benefit from this work being done.

In some implementations, the values of a description parameter may include a description of a given work unit record. A description of a given work unit record may describe, provide details, and/or provide other information regarding a unit of work characterized by the given work unit record. For example, a description of a given work unit record may include instructions for completion of a unit of work characterized by the given work unit record, details about the unit of work, a link associated with the unit of work, and/or other information. The link may be used by a user of the collaboration environment to access resources and/or information associated with the unit of work. By way of non-limiting example, a user may use the description of an individual work unit record to denote that a deliverable of the unit of work should be "colorful and fun." For further example, the user may include a link to a graphic that can be used by an assignee of the work unit record to assist in completion of the unit of work.

In some implementations, work unit records may define tasks. The work unit records defining tasks may be referred to as task records. The work unit information that defines tasks may be referred to as task information and/or other information. Task information may include values of work unit parameters for tasks managed within the collaboration environment. The work unit parameters for tasks may be referred to as "task parameters." The work unit parameters comprising tasks parameters may be specific to tasks and/or may include one or more parameters not shared with projects, objectives, and/or other records. The task parameters may characterize one or more tasks created, assigned, and/or managed within the collaboration environment and/or via the collaboration environment, and/or the metadata associated with the one or more tasks.

In some implementations, work unit records may define projects. The work unit records defining projects may be referred to as project records. The work unit information that defines projects may be referred to as project information and/or other information. Project information may include values of work unit parameters for projects managed within the collaboration environment. The work unit parameters for projects may be referred to as "project parameters." The work unit parameters comprising project parameters may be specific to project records and may include one or more parameters not shared with tasks, objectives, portfolios, and/or other records. The project parameters may characterize one or more projects created, owned, assigned, and/or managed within the collaboration environment and/or via the collaboration environment, and/or the metadata associated with the one or more projects. Individual ones of the projects may be associated with individual ones of the records. A given project may have one or more owners and/or one or more collaborators working on the given project. The given project may be associated with one or more other units of work assigned to one or more users under the given project heading. In some implementations, projects may include one or more units of work that may directly facilitate progress toward fulfillment of the projects. Accordingly, completion of units of work may directly contribute to progress toward fulfillment of the project. By way of non-limiting illustration, an individual project may be associated with a client, and the units of work under the individual project heading may be work directly contributing to the fulfillment of a business relationship with the client.

The values of the project parameters may, by way of non-limiting example, include one or more of: one or more units of work associated with individual ones of the projects (which may include values of other work unit parameters defined by one or more work unit records), status information, user role information, one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), one or more project collaborators (e.g., an owner, one or more other project collaborators, collaborator access information, and/or other project collaborators and/or collaborator information), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

In some implementations, work unit records may define portfolios. The work unit records defining portfolios may be referred to as portfolio records. The work unit information that defines portfolios may be referred to as portfolio information and/or other information. Portfolio information may include values of work unit parameters for portfolios managed within the collaboration environment. The work unit parameters for portfolios may be referred to as "portfolio parameters." The work unit parameters comprising portfolio parameters may be specific to portfolio records and may include one or more parameters not shared with tasks, projects, objectives, and/or other records. The portfolio parameters may characterize one or more portfolios created, owned, assigned, and/or managed within the collaboration environment and/or via the collaboration environment, and/or the metadata associated with the one or more portfolios.

Individual ones of the portfolios may be associated with individual ones of the records. A given portfolio may have one or more owners and/or one or more collaborators working on the given portfolio. The given portfolio may be associated with one or more other records assigned to one or more users under the given portfolio heading. In some implementations, portfolios may be associated with units of work that may directly facilitate progress toward fulfillment of the portfolios. Individual portfolios may include one or more projects subordinate to the portfolio within individual hierarchies. Individual portfolios may include one or more other portfolios considered "subordinate" to the given portfolio within individual hierarchies. Accordingly, completion of units of work may directly contribute to progress toward fulfillment of the portfolio. By way of non-limiting illustration, an individual portfolio may be associated with a client, and the projects under the portfolio heading may be projects directly contributing to the fulfillment of a business relationship with the client.

The values of the portfolio parameters may, by way of non-limiting example, include and/or specify one or more of: information about one or more projects within a given portfolio (which may include values of project parameters defined by one or more project records), information about one or more other portfolios within a given portfolio (which may include values of portfolio parameters defined by one or more other portfolio records), a portfolio name, a portfolio description, a status and/or progress (e.g., an update, a hardcoded status update, a measured status, quantity of units of work remaining in a given project, completed units of work in a given project, and/or other status parameter), one or more attachments, notification settings, privacy settings, an associated URL, one or more interaction parameters (e.g., sources of the interactions, context of the interactions, content of the interactions, time for the interactions, and/or other interaction parameters), updates, ordering of projects within the given portfolio, hierarchical information (see, e.g., organization component 116), permissions information (see, e.g., organization component 116), state of a workspace for a given project within the given portfolio, metadata associated with the portfolios, custom fields (e.g., values created by users), and/or other information.

In some implementations, work unit records may define objectives. The work unit information defining objectives may be referred to as objective information. The objective information may include values of one or more work unit parameters that define the objectives. The values of the work unit parameters may be organized in objective records corresponding to objectives (sometimes referred to as "business objectives") managed, created, and/or owned within the collaboration environment. The work unit parameters corresponding to objectives may be referred to as "objective parameters." The work unit parameters comprising objective parameters may be specific to objectives and may include one or more parameters not shared with tasks and/or projects. A given objective may have one or more collaborators, and/or team members working on the given objective. Objectives may be associated with one or more units of work one or more users should accomplish and/or plan on accomplishing. Objectives may be created by a given user for the given user and/or created by the given user and assigned to be owned to one or more other users. Individual objectives may include one or more of an individual goal, an individual sub-goal, and/or other business objectives assigned to be owned by a user and/or associated with one or more users.

The objectives may be associated with a set of units of work that may indirectly facilitate progress toward fulfillment of the objectives. The set of units of work may not directly contribute to the progress. By way of non-limiting illustration, a connection between the set of units of work and a corresponding objective may be indirect in that completion of at least one of the units of work may have no direct impact on progress toward fulfillment of the objective. The concept of "no direct impact" may mean that completion of the at least one unit of work may not cause progress toward fulfillment of the business objective without independent action outside of the at least one unit of work and/or project. Instead, the fulfillment of the at least one unit of work may make such independent action more likely (e.g., through coercion, assistance, education, incentivization, reminder, etc.). However, in some implementations, objectives may be associated with one or more units of work that may directly facilitate progress toward fulfillment of the objectives. Accordingly, completion of the set of units of work may directly contribute to the progress toward fulfillment. Objectives may be associated with an objectives and key result (OKR) goal-setting framework. Objectives may be specified on one or more of a team basis, organization basis, and/or other specifications. In some implementations, objectives may be characterized as user objectives. User objectives may be specified on an individual user basis. A user objectives may be associated with a set of units of work assigned to a user that may indirectly (and/or directly) facilitate progress toward fulfillment of the user objective.

In some implementations, objectives may be described based on one or more of a business objective name, a business objective description, one or more business objective dates (e.g., a start date, a due date, and/or dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing objectives owned by the individual users may be determined based on one or more interactions by one or more users with a collaboration environment. In some implementations, one or more users may create and/or assign ownership of one or more objectives to themselves and/or another user. In some implementations, a user may be assigned to own an objective and the user may effectuate a reassignment of ownership of the objective from the user or one or more other users.

Progress information for the individual objectives may convey progress toward fulfillment of the individual objectives. In some implementations, the progress toward fulfillment of the business objectives may be specified as one or more of a quantitative value, a qualitative value, and/or other information. In some implementations, the quantitative value may be a percentage of completion, an integer value, a dollar amount, and/or other values. In some implementations, progress toward fulfillment of the individual objectives may be determined independently from incremental completion of the units of work associated with the individual objectives. The completion of the units of work associated with a given objective may not directly progress the given business objective toward fulfillment, but completing the units of work may make accomplishing the business objective more likely (e.g., through coercion, assistance, education, incentivization, reminder, etc.). However, in some implementations, progress toward fulfillment of the individual business objectives may be directly determined based on incremental completion of the units of work in individual sets of units of work associated with the individual business objectives.

User role information may specify one or more roles of individual users. A role may represent a position of an individual user. A role may represent one or more of how a user works, how a user is expected to work, how a user intends to work, and/or other considerations. The position may be specified based on a description of one or more of a job title, level, and/or other descriptions of position. A role may be specified with respect to a business organization as a whole and/or other specifications. By way of non-limiting illustration, a role may include one or more of the following: chief executive officer (or other officer), owner, manager, supervisor, accountant, associate, employee, intern, entry level, midlevel, senior, administrator, director, foreman, engineer, product developer, human resource officer, artist, art director, and/or other descriptions.

In some implementations, user role information may specify roles of the users within work unit records. A role may convey expected contribution of a user in completing and/or supporting a unit of work. By way of non-limiting illustration, a role within a work unit record may include one or more of owner, manager, creator, reviewer, approver, final decision maker, assignee, assignor, helper, liaison, and/or other descriptions. The individual roles of individual users within some units of work (e.g., a task) may be specified separately from the individual roles of the individual users within other units of work (e.g., a project associated with the task). The individual roles of individual users within the work unit records may be specified separately from the individual roles of the individual users within a business organization as a whole. For example, a business owner may have an "owner" role with respect to a business organization as a whole, while having a "reviewer" role within a project.

In some implementations, managing the environment state component 108 may include maintaining queues of work unit records assigned to the users. The queues may be presented to the users in a user interface of the collaboration environment to facilitate access to the work unit records via work unit pages. Individual queues may organize the work unit records in an order based on the individual end dates and/or other dates (e.g., start dates) and/or other ordering. Individual queues may be presented in a user interface based on one or more spatial arrangements. The particular spatial arrangement used by a user may be stored as part of a user record for the user. The spatial arrangements may include one or more of a list view, a calendar view, a board view, and/or other views. The list view may include a vertical arrangement of graphic icons representing work unit records. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.). The board view may include a grid of cells comprising columns and rows, where visual content item (e.g., icons) representing work unit records may be positioned in the cells. Columns may be associated with sections (e.g., clusters), and the cells within the column may be populated with visual content item representing work unit records that are associated with the sections.

In some implementations, environment state component 108 may be configured to manage information defining work unit pages (sometimes referred to simply as "pages") corresponding to the individual work unit records. Individual work unit pages may provide access to individual work unit records. Managing information may include one or more of determining, obtaining, receiving, requesting, checking, storing, modifying, and/or other operations. Managing information defining individual work unit pages may include providing information to the user interface component 110 to effectuate presentation of the work unit pages, and/or other information. In some implementations, individual work unit pages may include individual sets of interface elements displaying the values of one or more of the work unit parameters of the individual work unit records.

Users may access work unit records via the work unit pages by viewing, adding, changing, deleting, and/or otherwise interacting with values of work unit parameters stored by the work unit records. In some implementations, work unit pages providing access to tasks may be referred to as task pages; work unit pages providing access to projects may be referred to as project pages; and work unit pages providing access to objectives may be referred to as objective pages. In some implementations, user pages may include views of the collaboration environment that provide access to user records.

Figure 3:
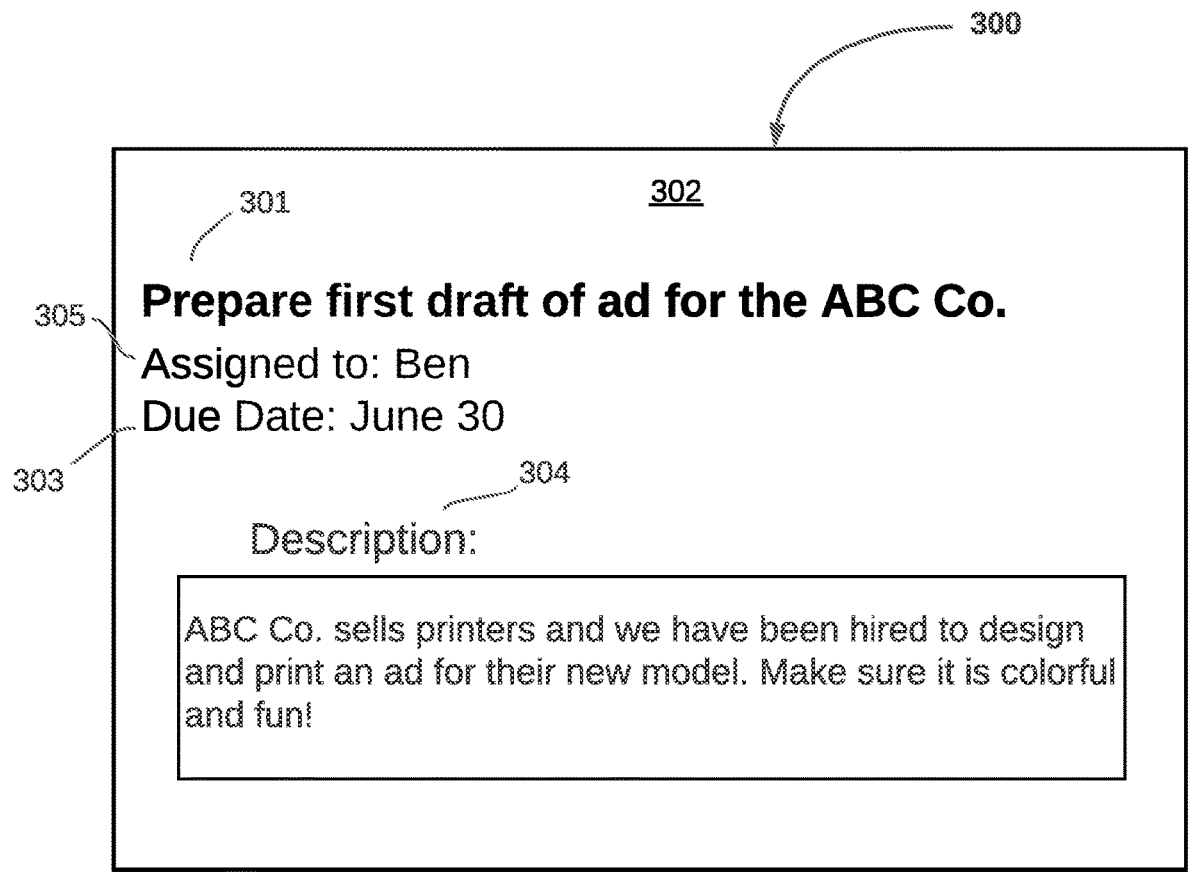
FIG. 3 illustrates a user interface, in accordance with one or more implementations.

FIG. 3 illustrates a user interface 300 of a collaboration environment, in accordance with one or more implementations. The user interface 300 may be representative of a work unit record describing a unit of work. The user interface 300 may include a view of a collaboration environment. In particular, the user interface 300 may comprise a work unit page 302 for the work unit record for the unit of work. The user interface 300 may display values of one or more work unit parameters and/or other information. By way of non-limiting illustration, a user interface element 301 may display a title of unit of work. A user interface element 305 may display an assignee of unit of work. A user interface element 304 may display a description of unit of work. A user interface element 303 may display a due date of unit of work. A user may provide input via the user interface to view and/or edit the work unit record for the unit of work.

Returning to FIG. 1, in some implementations, environment state information may be continually monitored and/or updated as users interact with the collaboration environment over time. The environment state component 108 may store and/or archive the environment state information continuously, periodically, and/or based on user request to archive. The stored and/or archived environment state information may be referred to as historical environment state information and/or other information.

Individual hierarchies of work unit records may define hierarchical organization among work unit records. The hierarchical organization may provide users with a way to organize units of work based on relation to other units of work. By way of non-limiting example, a user may identify a task as subordinate within an individual hierarchy to another task, such that the task is a sub-task to the other task. A sub-task to a task may indicate a unit of work that must be done before, is related to, or assists completion of the task. By way of non-limiting example, a user may identify a task as being part of a project, such that the task is subordinate within an individual hierarchy to the project. A task within a project may indicate a unit of work that must be done before, is related to, or assists completion of the project. Individual hierarchies may also provide users with the ability to identify tasks, projects, and/or portfolios as subordinate within one or more individual hierarchies to one or more portfolios.

Portfolios may be used to track progress of large amounts of work to be completed. Further, projects and portfolios may be used to organize work applying to a specific category (e.g., a list of clients who pay an hourly rate, work managed by a specific person, a specific type of work, etc.). Organization of units of work provided by individual hierarchies may increase understandability of work structure and increase efficiency. Additionally, organization of the work may enable the collaboration environment to provide insights and notifications regarding related units of work, further increasing understandability and efficiency.

Hierarchical information of individual work unit records may include a position of the individual work unit records in individual hierarchies. By way of non-limiting illustration, a position may specify one or more of a work unit record being superior within an individual hierarchy to another work unit record, a work unit record being subordinate within an individual hierarchy to another work unit record, and/or other information. As a result, individual work unit records in individual sets of work unit records may be subordinate to other individual work unit records in the individual sets of work unit records. For example, a work unit record may define a unit of work comprising a task, and a subordinate work unit record may define a unit of work comprising a sub-task to the task. An individual hierarchy may define a relationship between work unit records. A work unit record may have some restrictions placed on it by virtue of having a subordinate work unit record. The restrictions may be placed on the work unit record by virtue of dependency parameters being assigned to the work unit record according to a position of the work unit record in an individual hierarchy. Assigning one or more dependency parameters to an individual work unit record may result in the one or more dependency parameters being included in the individual work unit record. By way of non-limiting illustration, a work unit record may be restricted from access (or restricted from marking complete) by one or more users unless and/or until a subordinate work unit record is completed and/or started. As used herein the terms "hierarchy of work unit records" and "hierarchy" may be used interchangeably. The hierarchical information included in a first record may define the first record as subordinate within one or more individual hierarchies to one or more other records.

Figure 6:
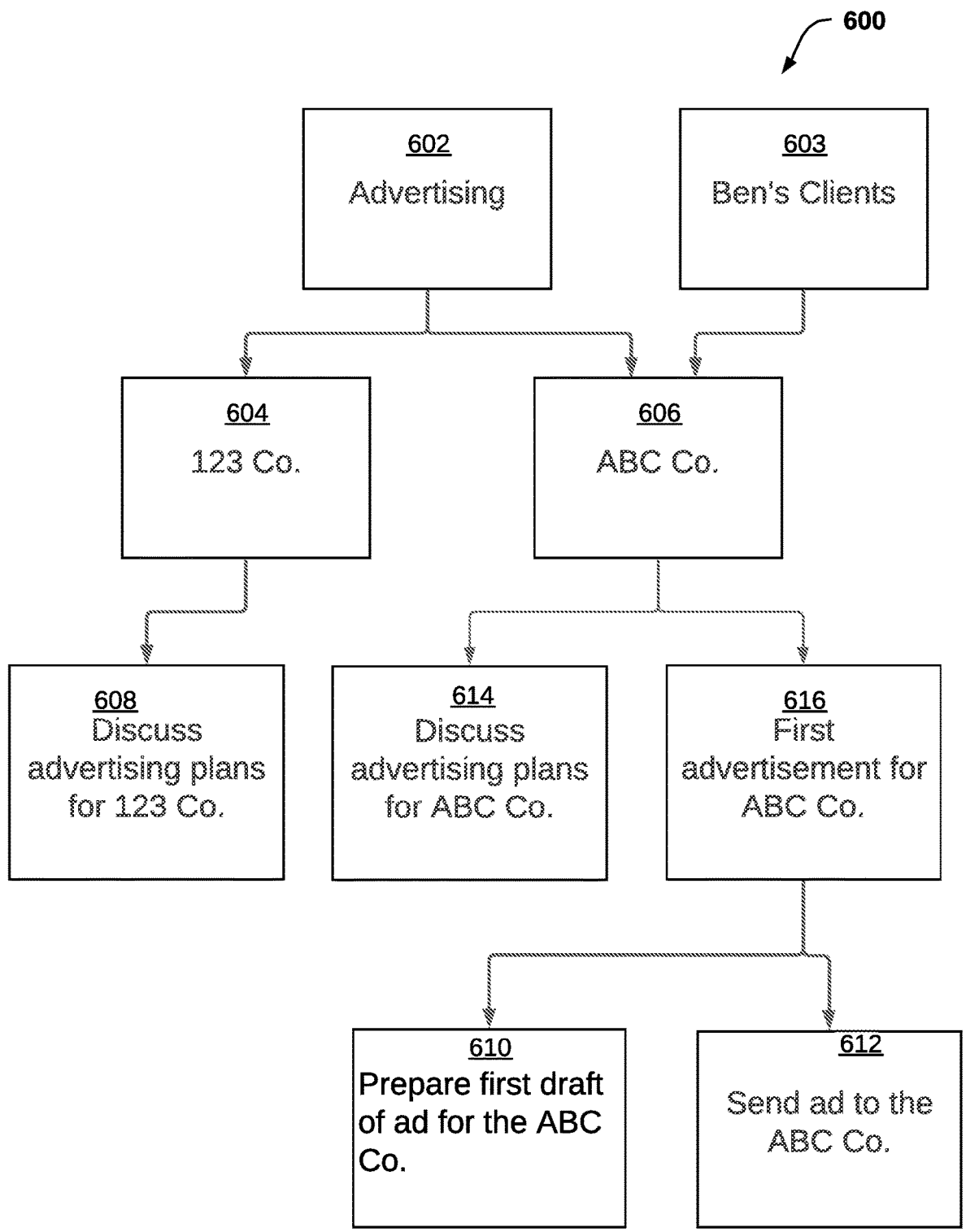
FIG. 6 illustrates a hierarchy of work unit records, in accordance with one or more implementations.

FIG. 6 illustrates a hierarchy 600 of work unit records, in accordance with one or more implementations. The hierarchy 600 may include one or more portfolios, one or more projects, one or more tasks, and/or other content. By way of non-limiting illustration, the hierarchy 600 may include portfolios 602 and 603; projects 604 and 606; and tasks 608, 610, 612, 614, and 616.

By way of illustration, a portfolio 602 may include a title of "Advertising" and may be used to organize clients of a company that receive advertising services. Project 606 may include a name of "ABC Co." and organize work done or to be done by the company for a client named "ABC Co." By way of non-limiting illustration, ABC Co. may have hired the company to provide advertising services. As such, project 606 may be identified as subordinate to portfolio 602. Portfolio 603 may include a name of "Ben's Clients" and be used to organize clients managed by and/or work assigned to a member of the company named Ben. ABC Co. may be a client managed by Ben. As such, project 606 may also be identified as subordinate to portfolio 603.

By way of non-limiting illustration, tasks 610, 612, 614, and 616 may be tasks representing work to be completed for the ABC Co. By way of further illustration, tasks 610 and 612 may be tasks representing units of work that aid in the completion of task 616. As such, tasks 610 and 612 may be identified as subordinate to task 616. Restrictions may be placed on task 616 by virtue of having subordinate work unit records. For example, one such restriction may include task 616 being restricted from being marked as complete until task 612 is marked as complete. By way of further illustration, tasks 614 and 616 may be identified as subordinate to project 606. This organization of work may increase understandability of work for the company to complete. Further, this organization of work may enable the collaboration environment to provide specific insights and notifications regarding the work to the users.

By way of non-limiting illustration, project 604 may include a name of "123 Co." and organize work done or to be done by the company for a client named "123 Co." Task 608 may representing work to be completed for 123 Co. As such, task 608 may be identified as subordinate to project 604.

Returning to FIG. 1, the user interface component 110 may be configured to effectuate presentation of instances of a user interface of the collaboration environment. The user interface component 110 may be configured to effectuate communication of information defining the user interface to individual client computing platforms so that the client computing platforms present the user interface. The user interface may provide one or more views of the collaboration environment and/or provide other features and/or functionality. The one or more views may include one or more pages of the collaboration environment. In some implementations, an individual view of the collaboration environment may textually and/or graphically display information from one or more of a user record, a task record, project record, an objective record, and/or other records. By way of non-limiting illustration, a view may display one or more of a work unit page, a project page, a business objective page, a queue of units of work, and/or other information. The user interface may include one or more portions. The one or more portions may include an input portion. The input portion may be configured to receive user input of individual ones of record creations within the collaboration environment and/or edits to records within the collaboration environment.

Returning to FIG. 1, training component 112 may be configured to obtain and/or generate model training information. Obtaining and/or generating the model training information may include obtaining a set of existing records of the collaboration environment. The training component 112 may be configured to obtain work unit information from the set of existing records. In particular, the training component 112 may be configured to obtain one or more of hierarchical information, clustering information, values of the title parameter, values of the description parameter, and/or other information from existing records. The obtained information may be organized into training input information and training output information.

The training input information may include a subset of work unit information included in the existing work unit records. The subset of work unit information that makes up the training input information may include values of one or more of the title parameter, the description parameter, and/or other parameters obtained by the training component 112. In some implementations, the inventors of the present disclosure have determined that training the model based on title of records (and/or other text-based information, such as description) may improve the classification of records using machine learning, while requiring relatively limited input.

The training component 112 may be configured to perform a natural language processing operation on the training input information to determine semantic meaning of the training input information.

By way of non-limiting example, the natural language processing operation may include one or more of semantic analysis, paraphrase induction, simplification, compression, clause fusion, expansion, and/or other operations. Semantic analysis may determine individual meanings of individual works, phrases, sentences, and/or other content. Paraphrase induction may include preserving original meaning. By way of non-limiting example, paraphrase induction may include rewording and/or rearranging one or more of phrases, clauses, and/or other content. Simplification may include preserving original meaning. Simplification may include splitting up sentence or phrase for readability. Compression may include preserving important aspects. Compression may include deleting content for summarization. Fusion may include preserving important aspects. Fusion may combine language elements for summarization. Expansion may include preserving original meaning and embellishing on the original content. Expansion may include introducing new content that supports or broadens the original meaning. Sentence semantics may be lossless with paraphrasing and simplification. Sentence semantics may be lossy with compression and fusion.

The training output information may include one or more of clustering information, hierarchical information, and/or other information included in the existing work unit records.

Training a model using the model training information may generate a trained model that leverages how users classify records within a hierarchy and/or cluster. The trained model may thereafter be configured to classify other records into clusters and/or hierarchies.

In some implementations, the set of existing records used for training may be particular types of records of the collaboration environment. In some implementations, a set of existing records used for training may include existing records of a set or subset of users of the system 100. Accordingly, the trained model may be particularly adapted for the set or subset of the users. By way of non-limiting illustration, a set of users may be associated with a given business entity such that the business entity may have an account within system 100 which provides access by the set of users (e.g., employees of the given business entity). The set of existing records may be obtained from existing records specific to the set of users associated with the given business entity such that the resulting trained model may be particularly adapted to the set of users. By adapting the model to a specific set of users, the output from the trained model may be more accurate and/or relevant for that set of users.

Training component 112 may be further configured to train a model using the training information to generate a trained model configured to classify records within a hierarchy and/or cluster. The trained model may use natural language processing to determine meanings of words and/or phrases of the input into the trained model. By way of non-limiting illustration, trained model may be provided, as input, a subset of work unit information for work unit records yet to be classified by hierarchy and/or cluster. The subset of work unit information may include one or more of title, description, and/or other information. The trained model may use natural language processing to determine meanings of the title and/or the description included in the subset of the work unit information.

In some implementations, the model may be a machine learning model. Training component 112 may be configured to train the model until the model achieves a desired level of accuracy on the training information. In some implementations, the machine learning model may utilize one or more of an artificial neural network, naïve bayes classifier algorithm, k means clustering algorithm, support vector machine algorithm, linear regression, logistic regression, decision trees, random forest, nearest neighbors, and/or other approaches. The training component 112 may utilize training techniques such as deep learning. The training component 112 may utilize training techniques such as one or more of supervised learning, semi-supervised learning, unsupervised learning, reinforcement learning, and/or other techniques.

In supervised learning, the model may be provided with known training dataset that includes desired inputs and outputs, and the model may be configured to find a method to determine how to arrive at those outputs based on the inputs. The model may identify patterns in data, learn from observations, and make predictions. The model may make predictions and may be corrected or validated by an operator—this process may continue until the model achieves a high level of accuracy/performance. Supervised learning may utilize approaches including one or more of classification, regression, and/or forecasting.

Semi-supervised learning may be similar to supervised learning, but instead uses both labelled and unlabeled data. Labelled data may comprise information that has meaningful tags so that the model can understand the data, while unlabeled data may lack that information. By using this combination, the machine learning model may learn to label unlabeled data.

For unsupervised learning, the machine learning model may study data to identify patterns. There may be no answer key or human operator to provide instruction. Instead, the model may determine the correlations and relationships by analyzing available data (see, e.g., text corpus described below). In an unsupervised learning process, the machine learning model may be left to interpret large data sets and address that data accordingly. The model tries to organize that data in some way to describe its structure. This might mean grouping the data into clusters or arranging it in a way that looks more organized. Unsupervised learning may use techniques such as clustering and/or dimension reduction.

Reinforcement learning may focus on regimented learning processes, where the machine learning model may be provided with a set of actions, parameters, and/or end values. By defining the rules, the machine learning model then tries to explore different options and possibilities, monitoring and evaluating each result to determine which one is optimal. Reinforcement learning teaches the model trial and error. The model may learn from past experiences and begins to adapt its approach in response to the situation to achieve the best possible result.

The trained model may be configured to receive input of the subset of the work unit information included in other ones of the work unit records yet to be classified into a hierarchy and/or cluster. The trained model may be configured to output classifications of the other ones of the work unit records in individual hierarchies and/or individual clusters managed by the collaboration environment. The trained model may classify the other ones of the work unit records into the individual clusters independently from being classified into the individual hierarchies. The classifications of the other ones of the work unit records may be used to generate hierarchical information and/or clustering information for the other ones of the work unit records.

Training component 112 may be further configured to store the trained model in non-transitory electronic storage 128. Storing the model may enable the trained model to be used with new inputs.

The classification prediction component 114 may be configured to identify a collection of work unit records to be applied to the trained machine learning model. The collection of the work unit records may refer to a set of one or more work unit records selected for further processing. By way of non-limiting illustration, a user may select the collection of work unit records from a view of the collaboration environment and request that the trained machine learning model be applied. The classification prediction component 114 may be configured to obtain a subset of the work unit information included in a collection of the work unit records, and provide the subset of the work unit information as input for the trained model. The trained model may be configured to provide output based on input(s). The trained model may be configured to perform natural language processing on the inputs.

The output may include predictions of classifications of the work unit records in the collection within one or more hierarchies and/or clusters. The predictions of classifications into one or more hierarchies and/or clusters may be referred to as "recommendations of hierarchical information for the records." The predictions of classifications into one or more clusters may be referred to as "recommendations of clustering information for the records." The classification prediction component 114 may be further configured to obtain the output from the trained model.

The organization component 116 may be configured to generate hierarchical information and/or clustering information for the work unit records in a collection of work unit records that has been applied to the trained model. The hierarchical information and/or clustering information may be generated from the output of the trained model. The hierarchical information may define the hierarchical organization among individual work unit records in a collection derived from the classifications into the one or more hierarchies. The clustering information may define the organization designation among individual work unit records in a collection derived from the classifications into the one or more clusters.

The user interface component 110 may be configured to facilitate presentation of the output from the trained model to the users via client computing platform(s) 104. By way of non-limiting illustration, work unit pages for work unit records may be presented within display recommended hierarchical information and/or clustering information derived from the trained model. The user interface component 110 may be further configured to receive user input conveying corrections and/or confirmations of one or more classifications of records output by the trained model. A confirmation of an individual classification may be considered as a validation of the individual classification. Corrections and confirmations may be fed back into the trained model to further refine the model.

For example, a user accessing a page for a work unit record that has automatically classified the record may be prompted to correct and/or validate information appearing on the page. In some cases, the user may refine/change a title, description, and/or other information, which may result in the work unit information for the work unit record being updated. The work unit information for the work unit record being updated may prompt the trained model to output new classifications according to updated work unit information. In other cases, the user may accept and/or reject positions of the work unit record within one or more hierarchies and/or one or more clusters. Further, the user may modify and/or designate a position of the work unit record within one or more individual hierarches and/or designate the work unit record as part of one or more clusters. This may be a modification of the classifications of the work unit record output by the trained model. Rejections and/or modifications of the classifications output by the trained model may be a correction of the output of the trained model. By way of non-limiting example, the user may accept and/or reject one or more classifications. The corrections and/or validations may cause the model to adapt and/or learn so that it may achieve a high level of accuracy/performance. Prompts or notifications may be presented to the user which represent decision(s) made by the machine learning model, where the user can then correct and/or validate the decision(s). This may provide a user-friendly way to validate what was generated and may be an expansion of the training of the model itself. In some implementations, the training component 112 may be configured to update/refine the trained model based on user corrections and/or validations to classifications of records output by the model.

Figure 4:
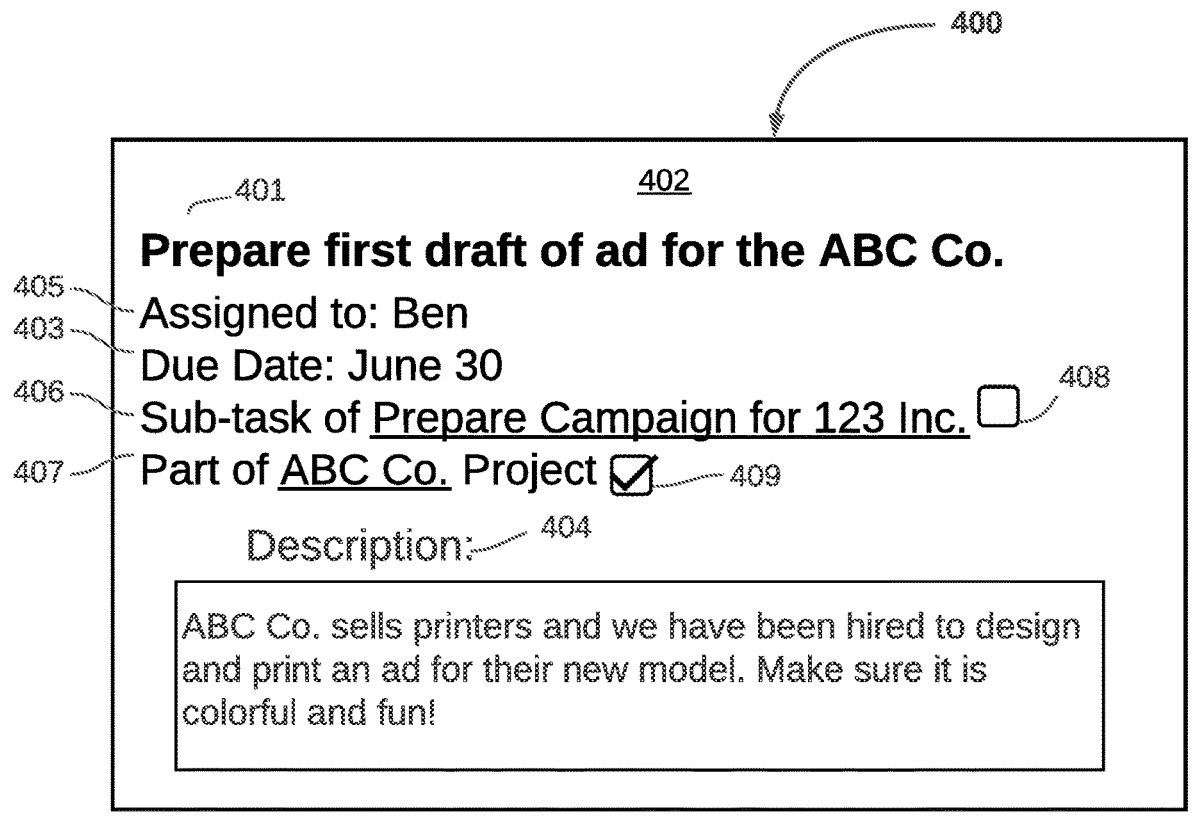
FIG. 4 illustrates a user interface, in accordance with one or more implementations.

FIG. 4 illustrates a user interface 400 of a collaboration environment, in accordance with one or more implementations. The user interface 400 may be representative of a work unit record describing a unit of work. The user interface 400 may include a view of a collaboration environment. In particular, the user interface 400 may comprise a work unit page 402 for the work unit record of the unit of work. The user interface 400 may display values of one or more work unit parameters and/or other information. By way of non-limiting illustration, a user interface element 401 may display a title of unit of work. A user interface element 405 may display an assignee of unit of work. A user interface element 404 may display a description of unit of work 401. A user interface element 403 may display a due date of unit of work. A user interface element 406 may display a classification of the work unit record into a first predicted hierarchy (e.g., subordinate to "Prepare Campaign for 123 Inc."). A user interface element 407 may display a classification of the work unit record into a second predicted hierarchy (e.g., subordinate to a project "ABC Co.").

A user interface element 408 may display a checkbox enabling the user to validate or correct the classification into the first predicted hierarchy. By way of non-limiting example, the user may not check user interface element 408 to indicate the classification may be incorrect.

A user interface element 409 may display a checkbox enabling the user to validate or correct the classification into the second precited hierarchy. By way of non-limiting example, the user may check user interface element 409 to indicate the classification was correct, such that the user is validating the classification. The user input to the user interface elements 408 and 409 may be used to update or refine the trained model.

Figure 5:
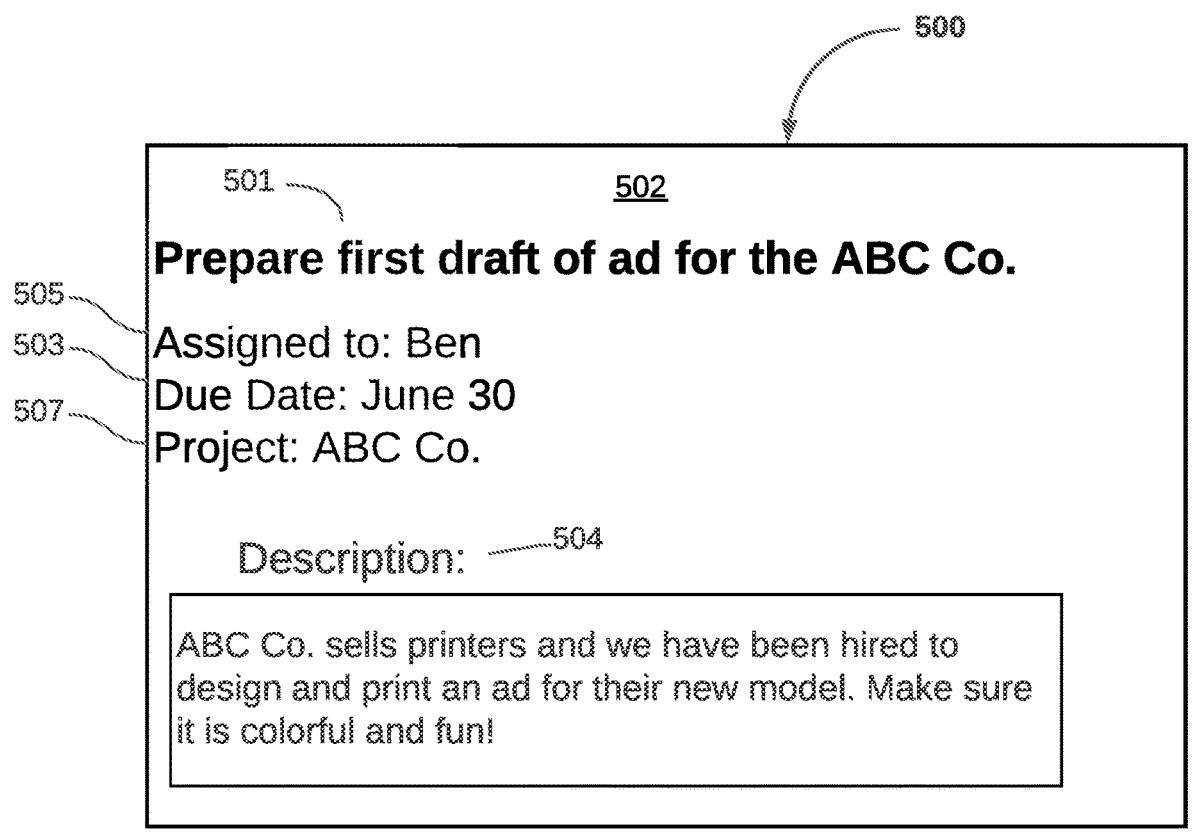
FIG. 5 illustrates a user interface, in accordance with one or more implementations.

FIG. 5 illustrates a user interface 500 of a collaboration environment, in accordance with one or more implementations. The user interface 500 may include a view of a collaboration environment as a result of user validation of classification(s) made by a trained model. The user interface 500 may be representative of a work unit record describing a unit of work that may be the same as or similar to user interface 400 in FIG. 4. In particular, the user interface 500 may comprise a work unit page 502 for a unit of work. The user interface 500 may display values of one or more work unit parameters and/or other information. By way of non-limiting illustration, a user interface element 501 may display a title of unit of work. A user interface element 505 may display an assignee of the unit of work. A user interface element 504 may display a description of the unit of work. A user interface element 503 may display a due date of the unit of work. A user interface element 507 may display a name of a project to which the work unit record of the unit of work is classified under a hierarchy. By way of non-limiting example, the work unit record that describes unit of work may be classified as subordinate within the individual hierarchy to the project with the name "ABC Co." as a result of a classification prediction by a trained model. By way of non-limiting example, the work unit record that describes unit of work may be classified as subordinate within the individual hierarchy to the project with the name "ABC Co." as a result of a user validation of a classification by the trained model (see, e.g. FIG. 4).

Returning to FIG. 1, organization component 116 may be configured to update hierarchical information and/or clustering information of records managed by the collaboration environment. Organization component 116 may be configured to update the hierarchical information and/or the clustering information of individual records responsive to receiving confirmation and/or correction of one or more classifications of records. Updating the hierarchical information of the records may update individual hierarchies managed by the collaboration environment. Updating the clustering information of the records may update individual clusters managed by the collaboration environment. Updating the hierarchical information and/or the clustering information of the records may result in environment state information being updated.

In FIG. 1, in some implementations, server(s) 102, client computing platform(s) 104, and/or external resource(s) 126 may be operatively linked via one or more electronic communication links. For example, such electronic communication links may be established, at least in part, via a network 118 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resource(s) 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resource(s) 126 may include sources of information outside of system 100, external entities participating with system 100, and/or other resources. In some implementations, some or all of the functionality attributed herein to external resource(s) 126 may be provided by resources included in system 100.

Server(s) 102 may include electronic storage 128, one or more processors 130, and/or other components. Server(s) 102 may include communication lines, or ports to enable the exchange of information with a network 118 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, 116, and/or other components. Processor(s) 130 may be configured to execute components 108, 110, 112, 114, and/or 116, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 130 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 130 may be configured to execute one or more additional components that may perform some or all of the functionality attributed below to one of components 108, 110, 112, 114, and/or 116.

Figure 2A:
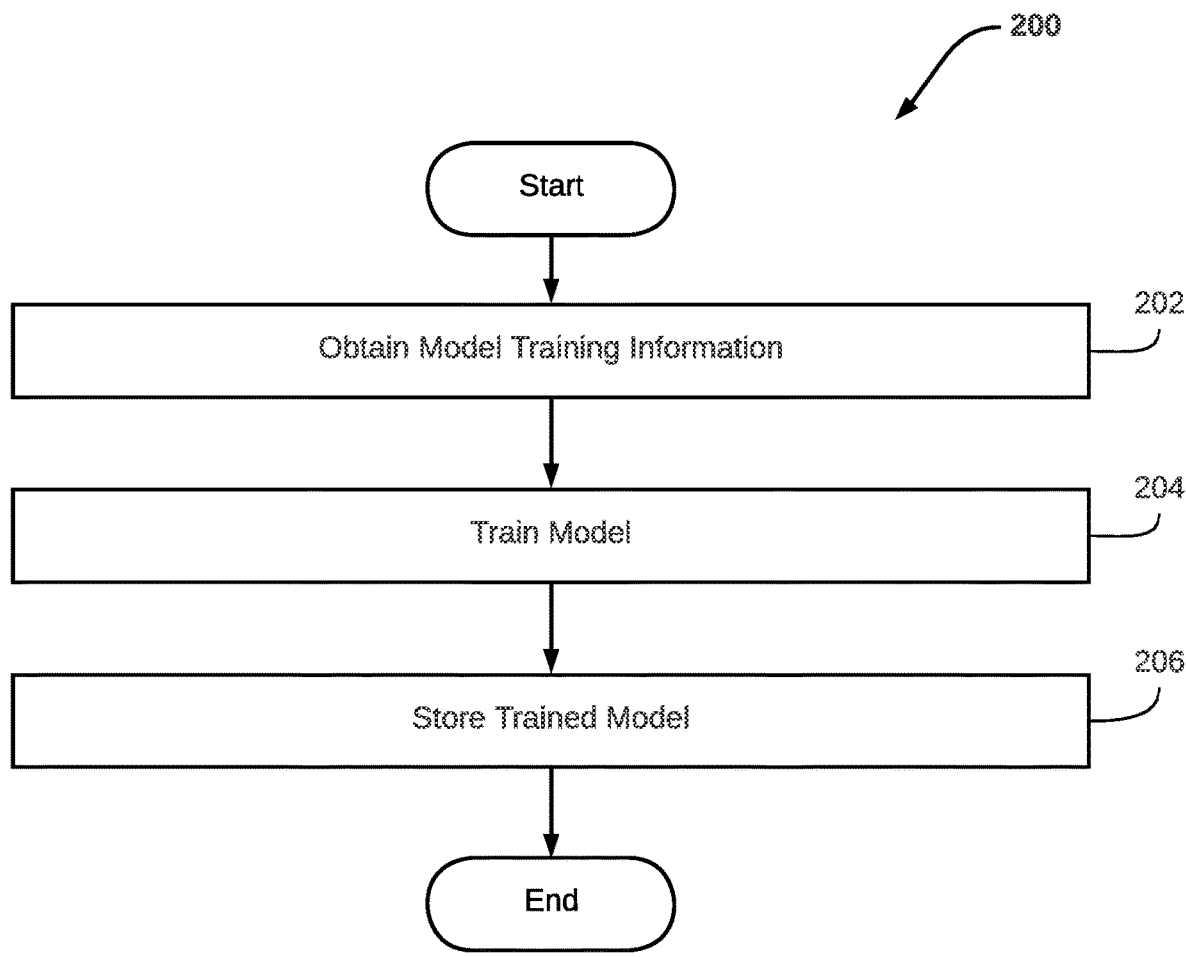
FIG. 2A illustrates a method to train a model to classify records managed by a collaboration environment, in accordance with one or more implementations.

FIG. 2A illustrates a method 200 to train a model to classify records managed by a collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2A and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may obtain model training information. Obtaining the model training information may include obtaining a set of existing records of the collaboration environment. Work unit information may be obtained and/or derived from the set of existing records. In particular, one or more of hierarchical information, clustering information, values of the title parameter, values of the description parameter, and/or other information may be obtained and/or derived from existing records in order to obtain the model training information. The model training information may include training input information and training output information. The training input information may include a subset of work unit information included in the existing work unit records. The subset of work unit information that makes up the training input information may include values of one or more of a title parameter, a description parameter, and/or other parameters. The model training output information may include one or more of clustering information, hierarchical information, and/or other information included in the work unit records. Operation 202 may be performed by one or more hardware processors configured by machine-readable instructions including a component that is the same as or similar to training component 112 (shown in FIG. 1 and described herein), in accordance with one or more implementations.

An operation 204 may train a model using the training information to generate a trained model configured to classify records within a hierarchy and/or cluster of work unit records. The obtained work unit information provides insight on what information is deemed relevant by users (e.g., by the words they use). Training the model may include providing the training input information to the model as input. Training the model may include using the training output information as a desired output of the model given the training input information. The model may use natural language processing to determine meanings of words and/or phrases used in the title and/or the description included in the subset of the work unit information. The model may be a machine learning model. Training may continue until the model achieves a desired level of accuracy on the training information. Operation 204 may be performed by one or more hardware processors configured by machine-readable instructions including a component that is the same as or similar to training component 112 (shown in FIG. 1 and described herein), in accordance with one or more implementations.

An operation 206 may store the trained model. The trained model may be stored in non-transitory electronic storage. Operation 206 may be performed by one or more hardware processors configured by machine-readable instructions including a component that is the same as or similar to training component 112 (shown in FIG. 1 and described herein), in accordance with one or more implementations.

Figure 2B:
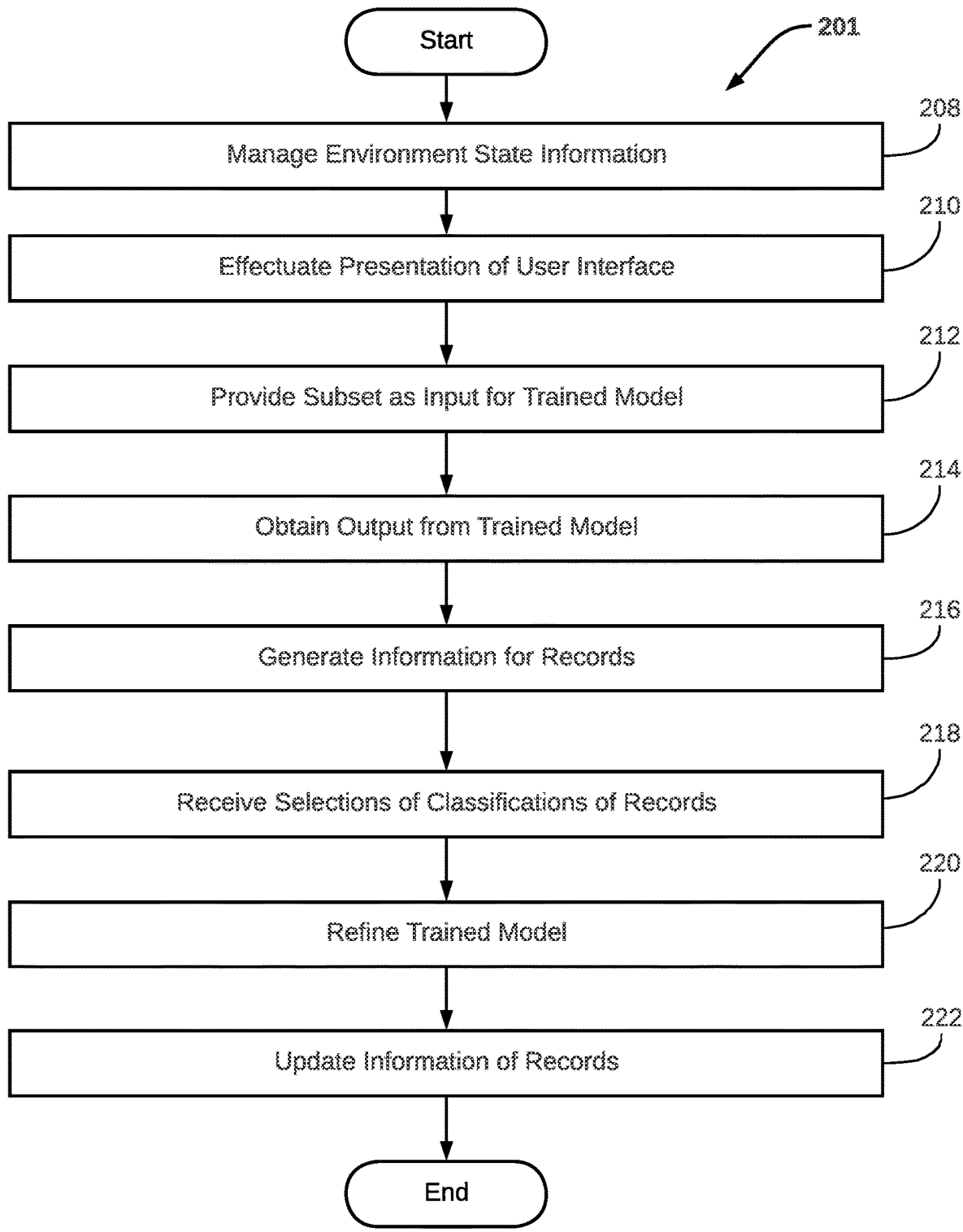
FIG. 2B illustrates a method to automatically classify records managed by a collaboration environment, in accordance with one or more implementations.

FIG. 2B illustrates a method 201 to classify records managed by a collaboration environment, in accordance with one or more implementations. The operations of method 201 presented below are intended to be illustrative. In some implementations, method 201 may be accomplished with one or more additional operations not described, and/or without one or more of the operations discussed. Additionally, the order in which the operations of method 201 are illustrated in FIG. 2B and described below is not intended to be limiting.

In some implementations, method 201 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 201 in response to instructions stored electronically on an electronic storage medium. The one or more processing devices may include one or more devices configured through hardware, firmware, and/or software to be specifically designed for execution of one or more of the operations of method 201.

An operation 208 may manage environment state information maintaining a collaboration environment. The collaboration environment may be configured to facilitate interaction by users with the collaboration environment. The environment state information may include one or more records. The one or more records may include work unit records and/or other records. The work unit records may include work unit information and/or other information. The work unit information may characterize units of work created, managed, and/or assigned to within the collaboration environment to the users who are expected to accomplish one or more actions to complete the units of work. The work unit information may comprise values of work unit parameters. Operation 208 may be performed by one or more hardware processors configured by machine-readable instructions including a component that is the same as or similar to environment state component 108 (shown in FIG. 1 and described herein), in accordance with one or more implementations.

An operation 210 may effectuate presentation of a user interface through which users create and/or update records within the collaboration environment. The user interface may include one or more portions. The one or more portions may include an input portion. The input portion may be configured to receive user input of individual ones of generation of records within the collaboration environment and/or edits to records within the collaboration environment. The first record may include work unit information including values of work unit parameters. Operation 210 may be performed by one or more hardware processors configured by machine-readable instructions including a component that is the same as or similar to user interface component 110 (shown in FIG. 1 and described herein), in accordance with one or more implementations.

An operation 212 may provide the subset of the work unit information included in a collection of the work unit records as input for a trained model. The collection of the work unit records may refer to a set of one or more work unit records selected for further processing. The trained model may be configured to provide output based on input(s). The output may include classifications of the work unit records in the collection within one or more hierarchies and/or clusters. Operation 212 may be performed by one or more hardware processors configured by machine-readable instructions including a component that is the same as or similar to classification prediction component 114 (shown in FIG. 1 and described herein), in accordance with one or more implementations.

An operation 214 may obtain the output from the trained model. Operation 214 may be performed by one or more hardware processors configured by machine-readable instructions including a component that is the same as or similar to classification prediction component 114 (shown in FIG. 1 and described herein), in accordance with one or more implementations.

An operation 216 may generate hierarchical information and/or clustering information for the work unit records in the collection. The hierarchical information and/or clustering information may be generated from the output of the trained model and/or other information. The hierarchical information may define the hierarchical organization among individual work unit records in the collection derived from the classifications into the one or more hierarchies. The clustering information may define one or more clusters for which individual work unit records in the collection are classified. Operation 216 may be performed by one or more hardware processors configured by machine-readable instructions including a component that is the same as or similar to organization component 116 (shown in FIG. 1 and described herein), in accordance with one or more implementations.

An operation 218 may receive user corrections and/or selections of one or more classifications output by the trained model. In some implementations, corrections and/or selections of one or more of the classifications of records may include corrections and/or selections of hierarchical information and/or clustering information generated for those classifications. Selection of an individual classification may be considered as a validation of the individual classification. Operation 218 may be performed by one or more hardware processors configured by machine-readable instructions including a component that is the same as or similar to user interface component 110 (shown in FIG. 1 and described herein), in accordance with one or more implementations.

An operation 220 may be configured to update and/or refine the trained model. The trained model may be updated and/or refined according to corrections and/or validations of the output from the trained model. The corrections and/or validations may cause the model to adapt and/or learn so that it may achieve a high level of accuracy/performance. Operation 220 may be performed by one or more hardware processors configured by machine-readable instructions including a component that is the same as or similar to training component 112 (shown in FIG. 1 and described herein), in accordance with one or more implementations.

An operation 222 may be configured to update hierarchical information and/or clustering information of records managed by the collaboration environment. The trained model may be updated and/or refined according to corrections and/or validations of the output from the trained model. Operation 222 may be performed by one or more hardware processors configured by machine-readable instructions including a component that is the same as or similar to organization component 116 (shown in FIG. 1 and described herein), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to train a machine-learning model to predict classifications of records managed by a collaboration environment, the system comprising:

non-transitory electronic storage storing model training information, the model training information including information from work unit records characterizing units of work managed, created, and/or assigned within a collaboration environment to users who are expected to accomplish one or more actions to complete the units of work, the collaboration environment being configured to facilitate interaction by the users with the collaboration environment, the work unit records including work unit information describing the units of work, wherein one of the work unit records corresponds to one of the units of work, wherein collections of the work unit records are organized into individual hierarchies of the work unit records, wherein an individual hierarchy conveys hierarchical organization among the work unit records in an individual collection of the work unit records, wherein the individual hierarchies of the work unit records are defined by hierarchical information included in the work unit records, and wherein the work unit information describes individual units of work by title, assignee, description of individual actions expected to be accomplished to complete the individual units of work, due date, completion status, and position within the individual hierarchies, the work unit records including a first work unit record for a first unit of work and a second work unit record for a second unit of work, the first work unit record and the second work unit record being part of a first individual hierarchy, the model training information including:

training input information, the training input information including a subset of the work unit information included in the work unit records; and training output information, the training output information including the hierarchical information of the work unit records; and one or more physical processors configured by machine-readable instructions to:
obtain the model training information;
train a model using the model training information to generate a trained model, the trained model being configured to output classifications of other ones of the work unit records within the individual hierarchies based on input of the subset of the work unit information included in the other ones of the work unit records, such that the classifications of the other ones of the work unit records within the individual hierarchies generates the hierarchical information for the other ones of the work unit records; and
store the trained model in the non-transitory electronic storage.

2. The system of claim 1, wherein the hierarchical organization among the work unit records in the individual collection of the work unit records causes a work unit record to be designated as subordinate to an other work unit record.

3. The system of claim 2, wherein the work unit record being designated as subordinate to the other work unit record restricts the work unit record from access until the other work unit record is marked complete.

4. The system of claim 1, wherein the subset of the work unit information includes the title and/or the description of the individual work unit records.

5. The system of claim 4, wherein the model uses natural language processing to determine meanings of words and/or phrases used in the title and/or the description, and wherein the training input information includes the meanings of the words and/or the phrases used in the title and/or the description.

6. The system of claim 5, wherein the model is a machine-learning model.

7. The system of claim 1, wherein individual ones of the collections of the work unit records are further organized into individual clusters of the work unit records, wherein an individual cluster conveys a common organizational designation among the work unit records in an individual collection of the work unit records classified within the individual cluster, and wherein the organizational designation includes a stated purpose or goal of the work unit records classified within the individual cluster.

8. The system of claim 7, wherein the individual clusters of the work unit records are defined by clustering information included in the work unit records.

9. The system of claim 8, wherein the trained model is configured to output classifications of the other ones of the work unit records within the individual clusters based on input of the subset of the work unit information included in the other ones of the work unit records, such that the classifications of the other ones of the work unit records within the individual clusters generates the clustering information for the other ones of the work unit records.

10. The system of claim 9, wherein the other ones of the work unit records are classified into the individual clusters independently from being classified into the individual hierarchies.

11. A system to classify records managed by a collaboration environment, the system comprising:
one or more physical processors configured by machine-readable instructions to:
manage environment state information maintaining a collaboration environment, the collaboration environment being configured to facilitate interaction by users with the collaboration environment, the environment state information including work unit records, the work unit records including work unit information describing units of work created, managed, and/or assigned within the collaboration environment to the users who are expected to accomplish one or more actions to complete the units of work, wherein one of the work unit records corresponds to one of the units of work, and wherein the work unit information describes individual units of work by title, assignee, description of individual actions expected to be accomplished to complete the individual units of work, due date, completion status, and position within individual hierarchies, and wherein the work unit records include a first work unit record for a first unit of work and a second work unit record for a second unit of work, the first work unit record and the second work unit record being part of a first individual hierarchy;
provide a subset of the work unit information included in a collection of the work unit records as input for a trained model, the trained model being configured to output classifications of the work unit records in the collection within one or more hierarchies, wherein an individual hierarchy conveys hierarchical organization among the work unit records classified into the individual hierarchy;
obtain the output from the trained model; and
generate, from the output, hierarchical information for the work unit records in the collection, the hierarchical information defining the hierarchical organization among the work unit records in the collection derived from the classifications into the one or more hierarchies.

12. The system of claim 11, wherein the hierarchical organization among the work unit records in the collection of the work unit records causes a work unit record to be designated as subordinate to an other work unit record.

13. The system of claim 12, wherein the work unit record being designated as subordinate to the other work unit record restricts the work unit record from access until the other work unit record is marked complete.

14. The system of claim 11, wherein the subset of the work unit information includes the title and/or the description of the individual work unit records.

15. The system of claim 14, wherein the trained model uses natural language processing to determine meanings of words and/or phrases used in the title and/or the description.

16. The system of claim 11, wherein individual collections of the work unit records are further organized into individual clusters of the work unit records, wherein an individual cluster conveys a common organizational designation among the work unit records in an individual collection of the work unit records classified within the individual cluster, and wherein the organizational designation includes a stated purpose or goal of the work unit records classified within the individual cluster.

17. The system of claim 16, wherein the individual clusters of the work unit records are defined by clustering information included in the work unit records.

18. The system of claim 17, wherein the trained model is configured to output classifications of the work unit records within the individual clusters based on input of the subset of the work unit information included in the work unit records, such that the classifications of the work unit records within the individual clusters generates the clustering information for the work unit records.

19. The system of claim 18, wherein the work unit records are classified into the individual clusters independently from being classified into the individual hierarchies.

20. The system of claim 19, wherein the one or more physical processors are further configured by the machine-readable instructions to:
- receive, from a client computing platform, validation of the hierarchical information and/or the clustering information generated from the output of the trained model; and
- refine the trained model based on the validation.

\* \* \* \* \*